United States Patent
Donderici

(10) Patent No.: US 10,444,396 B2
(45) Date of Patent: Oct. 15, 2019

(54) DEEP AZIMUTHAL SYSTEM WITH MULTI-POLE SENSORS

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 498 days.

(21) Appl. No.: 14/648,473

(22) PCT Filed: Dec. 31, 2012

(86) PCT No.: PCT/US2012/072316
§ 371 (c)(1),
(2) Date: May 29, 2015

(87) PCT Pub. No.: WO2014/105084
PCT Pub. Date: Jul. 3, 2014

(65) Prior Publication Data
US 2015/0338542 A1 Nov. 26, 2015

(51) Int. Cl.
*G01V 3/26* (2006.01)
*G01V 3/28* (2006.01)
*G01V 3/38* (2006.01)

(52) U.S. Cl.
CPC .......... *G01V 3/26* (2013.01); *G01V 3/28* (2013.01); *G01V 3/38* (2013.01)

(58) Field of Classification Search
CPC ....... F04C 2270/041; G01V 3/26; G01V 3/28; G01V 3/38

USPC ..................... 702/7; 324/339, 338
See application file for complete search history.

(56) References Cited

U.S. PATENT DOCUMENTS

| | | | |
|---|---|---|---|
| 5,955,884 A | 9/1999 | Payton et al. | |
| 6,181,138 B1* | 1/2001 | Hagiwara | E21B 47/02216 175/50 |
| 6,819,111 B2 | 11/2004 | Fanini et al. | |
| 6,903,533 B1 | 6/2005 | Geren et al. | |
| 6,903,553 B2* | 6/2005 | Itskovich | G01V 3/28 324/338 |
| 2001/0004212 A1 | 6/2001 | Omeragic et al. | |

(Continued)

FOREIGN PATENT DOCUMENTS

| | | |
|---|---|---|
| CN | 2621300 Y | 6/2004 |
| CN | 102162358 A | 8/2011 |

(Continued)

OTHER PUBLICATIONS

U.S. Appl. No. 14/646,178, filed May 20, 2015, Formation Imaging With Multi-Pole Antennas.

(Continued)

*Primary Examiner* — Mohammed Shamsuzzaman
(74) *Attorney, Agent, or Firm* — Gilliam IP PLLC

(57) ABSTRACT

Various embodiments include systems and methods of operation with respect to well logging. The systems and methods can include a number of transmitter sensors and a number of receiving sensors arranged to operate as a system including one or more multi-pole sensors. Such systems may be controlled to generate deep high-order azimuthal sensitivity. Additional apparatus, systems, and methods are disclosed.

34 Claims, 21 Drawing Sheets

(56) References Cited

U.S. PATENT DOCUMENTS

| | | | |
|---|---|---|---|
| 2004/0046561 A1* | 3/2004 | Itskovich | G01V 3/28 324/339 |
| 2005/0140373 A1* | 6/2005 | Li | G01V 3/28 324/338 |
| 2005/0189947 A1 | 9/2005 | Haugland | |
| 2007/0257679 A1* | 11/2007 | Fanini | G01V 3/28 324/366 |
| 2008/0158082 A1 | 7/2008 | Wang et al. | |
| 2008/0224707 A1* | 9/2008 | Wisler | G01V 3/28 324/338 |
| 2009/0091328 A1* | 4/2009 | Clark | G01V 3/28 324/338 |
| 2009/0295393 A1* | 12/2009 | Bespalov | G01V 3/28 324/339 |
| 2009/0295993 A1 | 12/2009 | Chhokra | |
| 2010/0156424 A1 | 6/2010 | Bittar et al. | |
| 2010/0231221 A1 | 9/2010 | Rosthal et al. | |
| 2010/0277177 A1* | 11/2010 | Alumbaugh | G01V 3/38 324/338 |
| 2010/0305863 A1* | 12/2010 | Abubakar | G01V 3/38 702/7 |
| 2010/0308832 A1 | 12/2010 | Clark et al. | |
| 2012/0218862 A1* | 8/2012 | Nakajima | G01V 1/44 367/81 |
| 2012/0242342 A1 | 9/2012 | Rabinovich et al. | |
| 2013/0144530 A1* | 6/2013 | Bittar | G01V 3/28 702/7 |
| 2015/0301218 A1 | 10/2015 | Donderici | |
| 2016/0238734 A1* | 8/2016 | Valori | E21B 47/0905 |

FOREIGN PATENT DOCUMENTS

| | | |
|---|---|---|
| CN | 104903749 B | 4/2017 |
| EP | 0544584 A1 | 6/1993 |
| RU | 2368922 C2 | 9/2009 |
| RU | 2421760 C1 | 6/2011 |
| RU | 2628000 C2 | 8/2017 |
| WO | WO-00/50926 A1 | 8/2000 |
| WO | WO-2008/061114 A2 | 5/2008 |
| WO | WO-2008/115229 A1 | 9/2008 |
| WO | WO-2012030327 A1 | 3/2012 |
| WO | WO-2014105084 A1 | 7/2014 |
| WO | WO-2014105086 A1 | 7/2014 |

OTHER PUBLICATIONS

"Australian Application Serial No. 2012397814, First Examiner Report dated Mar. 3, 2016", 3 pgs.
"Australian Application Serial No. 2012397814, Response filed Aug. 22, 2016 to First Examiner Report dated Mar. 3, 2016", 21 pgs.
"Canadian Application Serial No. 2,895,018, Office Action dated Jul. 15, 2016", 3 pgs.
"Chinese Application Serial No. 2012800775771, Office Action dated Jul. 22, 2016", (w/ English Translation), 15 pgs.
"European Application Serial No. 12890882.9, Office Action dated Jun. 26, 2015", 3 pgs.
"European Application Serial No. 12890882.9, Partial Supplementary European Search Report dated Jun. 23, 2016", 8 pgs.
"European Application Serial No. 12890882.9, Response filed Nov. 4, 2015 to Office Action dated Jun. 26, 2015", 26 pgs.
"European Application Serial No. 12891146.8, Extended European Search Report dated Jul. 22, 2016", 9 pgs.
"European Application Serial No. 12891146.8, Office Action dated Aug. 9, 2016", 2 pgs.
Li, Yu-Xia, et al., "Multi-Pole Array Acoustic Logging Tool (MPAL)", *Proceedings of the 16th Logging Symposium of the Chinese Petroleum Society*, (Jul. 2010), 86-96.
"Australian Application Serial No. 2012307812, Examination Report dated May 25, 2015", 2 pgs.
"Australian Application Serial No. 2012397812, Response filed Jul. 21, 2015 to Examination Report dated May 25, 2015", 29 pgs.
"International Application Serial No. PCT/US2012/072316, Response filed Oct. 16, 2014 to Written Opinion dated Aug. 27, 2013", 19 pgs.
"Canadian Application Serial No. 2,895,022, Office Action dated Sep. 19, 2016", 4 pgs.
"Canadian Application Serial No. 2,895,018, Office Action dated Feb. 13, 2017", 3 pages.
"Gulf Cooperation Council Application Serial No. 2013-26176, First Examination Report dated Nov. 3, 2016.", 5 pages.
"International Application Serial No. PCT/US2012/072316, International Preliminary Report on Patentability dated Apr. 9, 2015", 22 pgs.
"International Application Serial No. PCT/US2012/072316, International Search Report dated Aug. 27, 2013", 3 pgs.
"International Application Serial No. PCT/US2012/072316, Written Opinion dated Aug. 27, 2013", 8 pgs.
"International Application Serial No. PCT/US2012/072320, International Search Report dated Aug. 27, 2013", 3 pgs.
"International Application Serial No. PCT/US2012/072320, Written Opinion dated Aug. 27, 2013", 6 pgs.
"Russian Federation Application Serial No. 2015119890, Office Action dated Sep. 2, 2016", (w/ English Translation), 15 pgs.
Malaysian Application Serial No. PI 2015701820; substantive Exam Adverse Report; dated Feb 14, 2019; 3 pages.
EP Application Serial No. 12890882.9, Comm. Pursuant to Article 94(3), dated Jul. 23, 2019, 7 pages.

* cited by examiner

DEEP AZIMUTHAL SYSTEM WITH MULTI-POLE SENSORS

RELATED APPLICATIONS

This application is related to the co-pending and commonly assigned International Application Serial Number PCT/US2012/072320, titled "FORMATION IMAGING WITH MULTI-POLE ANTENNAS", filed on even date herewith, Dec. 31, 2012; the content of the co-pending International Application is hereby incorporated into this application by reference in its entirety.

PRIORITY APPLICATION

This application is a U.S. National Stage Filing under 35 U.S.C. 371 from International Application No. PCT/US2012/072316, filed on 31 Dec. 2012, which application is incorporated herein by reference in its entirety.

TECHNICAL FIELD

The present invention relates generally to systems related to oil and gas exploration.

BACKGROUND

In drilling wells for oil and gas exploration, understanding the structure and properties of the geological formation surrounding a borehole provides information to aid such exploration. However, the environment in which the drilling tools operate is often at a significant distance below the surface and measurements to manage operation of such equipment are made at these locations. Logging is the process of making measurements via sensors located downhole, which can provide valuable information regarding the formation characteristics. Measurement techniques can utilize electromagnetic signals that can make deep measurements, which are less affected by the borehole and the effects of the zone invaded by the drilling, and shallow measurements, which are near the tool providing the probe signals. Further, the usefulness of such measurements may be related to the precision or quality of the information derived from such measurements.

In electromagnetic sensing that can be applied to a borehole, imaging tools can achieve high azimuthal resolution, but cannot make deep measurements. On the other hand, some standard logging tools can achieve deep readings, but provide only limited azimuthal information. The main limitation can be related to the fact that dipoles are used in traditional induction logging tools. There are three types of methodologies that can be implemented to achieve azimuthal focusing: by positioning, by aperture, and by polarization.

Focusing by positioning can be achieved by placing the sensors in the vicinity of the area being sensed, for example, on a pad that can be made to contact a borehole wall. This is used in borehole imaging tools; however, their depth of investigation is limited in single well application, since depth of investigation is in the order of azimuthal resolution. Application of focusing by positioning is illustrated in FIG. 1 on the left of the vertical dotted line.

Focusing by aperture can be achieved by utilizing a special aperture such as a horn or a parabolic antenna. Although such system is very useful and can achieve very high azimuthal resolution in air, in a conductive formation it can lose its azimuthal focus at short distance from the aperture due to dispersive characteristics of the formation. Application of focusing by aperture is also shown in FIG. 1 on the left of the vertical dotted line.

Focusing by polarization, as used in current induction technology, can be deep but it can at most achieve three azimuthal modes, where only two of these are actively used, where an electromagnetic mode is a configuration, such as a field pattern, of an electromagnetic wave. This limitation is due to use of dipole wave phenomenon which limits the azimuthal information that can be gathered from deep inside the formation, as shown in FIG. 1 below the horizontal dotted line. As a result, obtaining high fidelity images deep within the formation by polarization has not been achieved.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
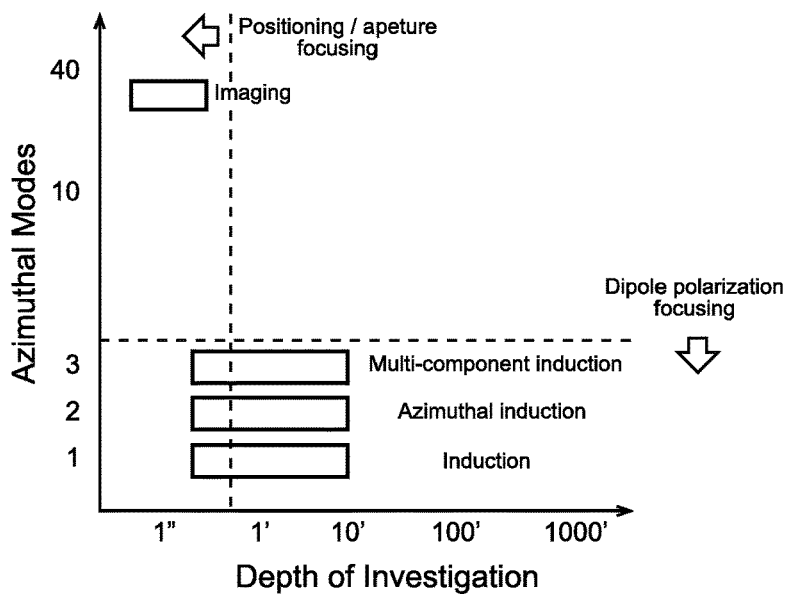
FIG. 1 shows a representation of azimuthal modes with respect to depth of investigation for positioning, aperture, and polarization focusing methodologies.

In various embodiments, an induction system, based on polarization focusing, can achieve deep azimuthal sensing. With such a system, deep azimuthal sensing can be achieved even from a single wellbore. An example system includes multi-pole antennas that can produce deep azimuthal sensitivity and a three-dimensional (3D) image of formation electromagnetic properties. With respect to azimuthal modes related to depth of investigation, a polarization focusing methodology of an example induction system can provide application in the regions of the plot of FIG. 1 above the horizontal dotted line and to the right of the vertical dotted line. In addition, the polarization focusing methodology can provide application in the regions of the plot of FIG. 1 above the horizontal dotted line and to the left of the vertical dotted line.

In various embodiments, systems and methods include one or more multi-pole sensors arranged to generate deep high-order azimuthal sensitivity. Deep means the range at which an approaching electromagnetic scatterer (such as a boundary) is detected and the range is substantially linearly proportional to the distance between the sensing transmitter and receiver. This is opposed to a range being proportional to the size of the borehole. High-order azimuthal sensitivity means a sensitivity pattern being periodic in shape with the periodicity greater than 2. The periodic shape can be sinusoidal or any other periodic shape. Deep high-order azimuthal sensitivity means the combination of deep and higher-order azimuthal sensitivity as discussed above.

For the purposes of this document, a "multi-pole sensor" is one that can create electric fields with substantially high-order harmonic azimuthal distribution, i.e. $E_q(\phi)=K(r)\exp(i(n\phi+\phi_0))$, where $n>2$ and $r>r_0$, $\phi$ is the azimuthal angle in cylindrical coordinates that is centered at the sensor, $\phi_0$ is a phase, $r_0$ is a distance comparable to wavelength, q is a cylindrical or spherical coordinate, and i is the imaginary number. For example, a multi-pole sensor may comprise multiple dipole sensors having controlled polarity. It is understood that due to the harmonic nature of the multi-pole sensor, in some embodiments, multi-poles with different orders n can be combined to generate a desired azimuthal field pattern based on the Fourier series.

Figure 2:
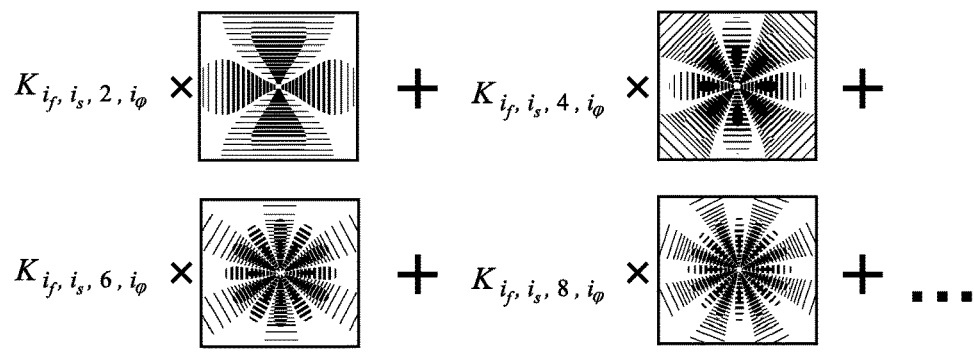
FIG. 2 illustrates deep focusing sensitivity via multi-pole induction, in accordance with various embodiments.
Figure 2:
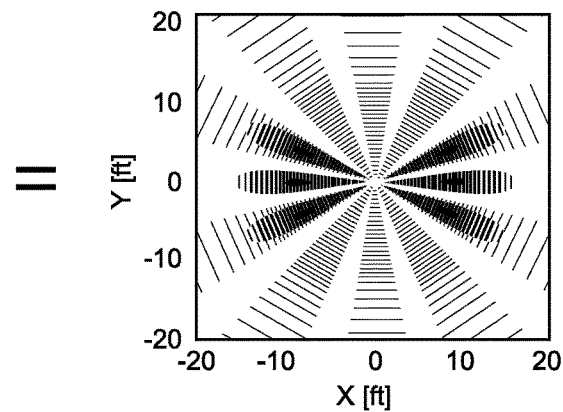

FIG. 2 illustrates deep focusing sensitivity via multi-pole induction. In FIG. 2, combination of higher order azimuthal modes in sensitivity are shown, where the coefficients K for modes 2, 4, 6, and 8 are for normalization. In this example, these modes are combined. The subscripts $i_f$, $i_s$, and $i_\phi$ are indices of frequency, spacing, and azimuthal angle. Such induction systems may produce high-order azimuthal modes in sensitivity; achieve deep azimuthal sensitivity; produce deep 3D images of formation properties; improve formation evaluation and geophysical/geomechanical interpretation significantly; improve geosteering significantly; and improve detection, assessment, and recovery of hydrocarbons.

Figure 3:
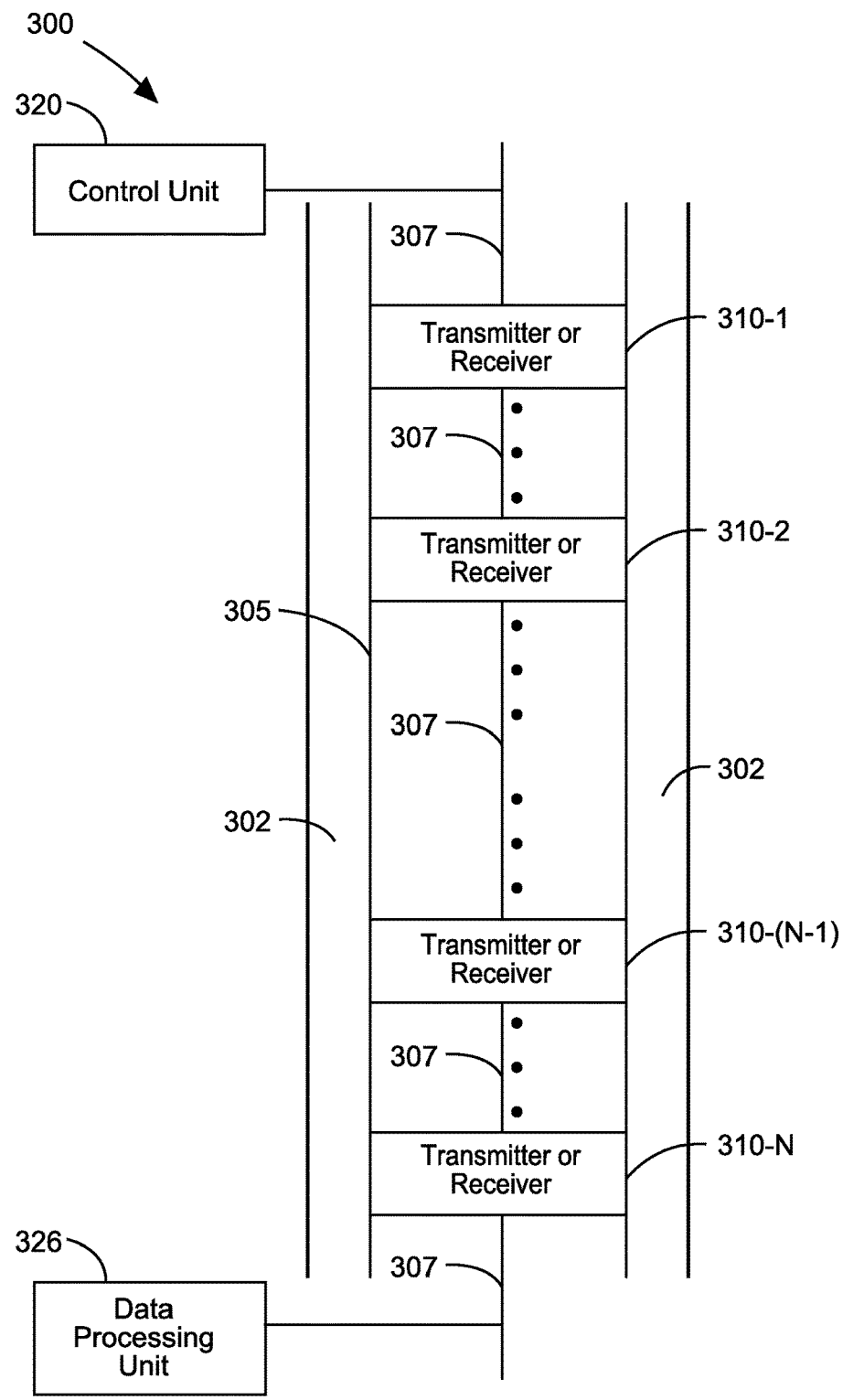
FIG. 3 shows a block diagram of an example system having a tool to make measurements to provide higher order azimuthal sensitivity, in accordance with various embodiments.

FIG. 3 shows a block diagram of an embodiment of an example system having a tool to make measurements to provide higher order azimuthal sensitivity, in accordance with various embodiments. Tool 305 can have an arrangement of transmitting sensors and receiving sensors such as transmitters and receivers 310-1, 310-2 . . . 310-(N−1), 310-N structured relative to a longitudinal axis 307 of tool 305. The transmitters and receivers 310-1, 310-2 . . . 310-(N−1), 310-N can be arranged to provide multi-pole antenna operation. An arrangement of transmitter antennas and receiver antennas can be structured along longitudinal axis 307 of tool 305, which is substantially perpendicular to the cross section of the tool, for example corresponding to the cross section of a collar in a drill string.

The arrangement of transmitters and receivers 310-1, 310-2 . . . 310-(N−1), 310-N can be operated by selecting transmitter-receiver pairs defined by the spacing between the transmitter and the receiver in each respective pair. Large spacings can be used to probe ahead of the drill bit and acquire deep signals. Smaller spacings can be used to probe in the formation regions around tool 305. For example, a shallow measurement may include contributions from regions about one inch to about 10 ft from the tool and a deep measurement may include contributions from regions about 5 ft to about 200 ft from the tool.

Apparatus 300 can include a control unit 320 to control activation of the transmitters of tool 305 and reception of signals at the receivers of tool 305. Control unit 320 can be structured to be operable to select antennas of a plurality of antennas in one or more transmitter-receiver pairs arranged to provide higher order azimuthal sensitivity when the apparatus is operated downhole in a well. Control unit 320 can be operated in conjunction with data processing unit 326 to process signals received from the receivers in tool 305.

Data processing unit 326 can be structured to be operable to process data from one or more deep measurements. Data processing unit 326 can include instrumentalities to perform one or more techniques to process signals from the receivers in the arrangement of transmitters and receivers 310-1, 310-2 . . . 310-(N−1), 310-N. Data processing unit 326 also can use the generated signals to determine formation properties around the borehole in which the tool is disposed. Received signals at the tool may be used to make geosteering decisions. Geosteering is an intentional control to adjust drilling direction.

The techniques to analyze the received signals can include various applications of inversion operations, forward modeling, using synthetic logs, and filtering techniques. Inversion operations can include a comparison of measurements to predictions of a model such that a value or spatial variation of a physical property can be determined. An inversion operation can include determining a variation of electrical conductivity in a formation from measurements of induced electric and magnetic fields. Other techniques, such as a forward model, deal with calculating expected observed values with respect to an assumed model. A synthetic log is a modeled log based on modeled response of the tool in known formation parameters. The synthetic log is created by numerically modeling the interaction of the tool and the formation, usually involving simulation of each depth of the log point by point.

Control unit 320 and/or data processing unit 326 can be integrated with tool 305 such that control unit 320 and/or data processing unit 326 are operable downhole in well 302. Control unit 320 and/or data processing unit 326 can be distributed along tool 305. Control unit 320 and/or data processing unit 326 can be located at the surface of well 302 operably in communication with tool 305 via a communication mechanism. Such a communication mechanism can be realized as a communication vehicle that is standard for well operations. Control unit 320 and/or data processing unit 326 can be distributed along the mechanism by which tool 305 is placed downhole in well 302. Apparatus 300 can be structured for an implementation in the borehole of a well as a measurements-while-drilling (MWD) system such as a logging-while-drilling (LWD) system. Alternatively, apparatus 300 may be configured in a wireline arrangement.

Figure 4C:
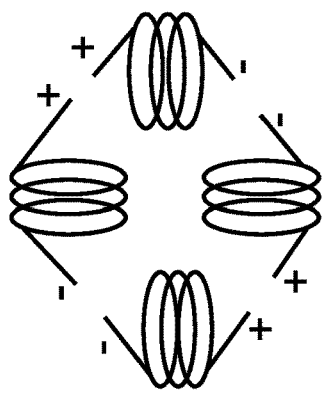
FIG. 4B-4C show example orientations of the dipoles that can be implemented in each substation of FIG. 4A in order to excite higher-modes, in accordance with various embodiments.
Figure 4B:
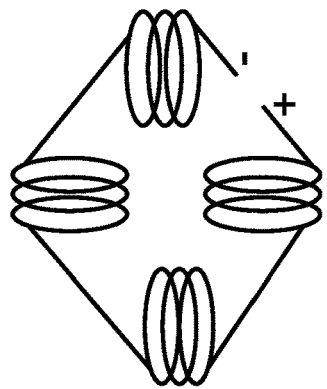
Figure 4A:
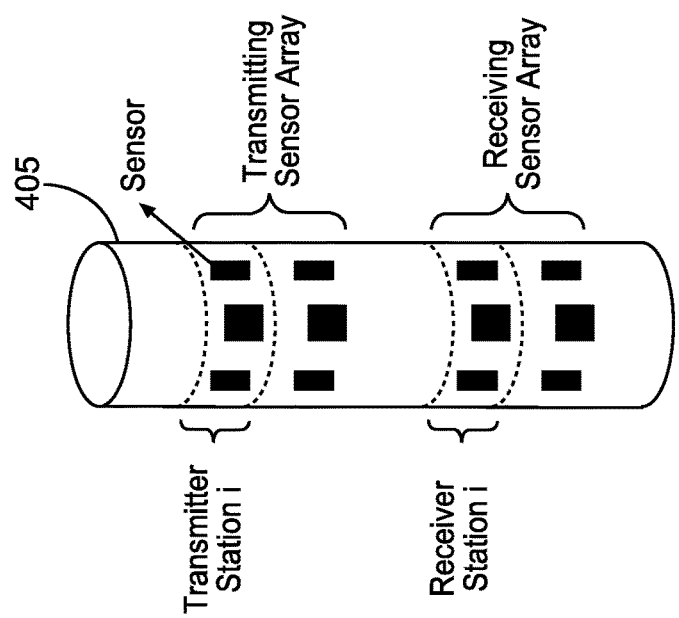
FIG. 4A shows an example embodiment of a tool operable as a sensing system in an induction system to provide polarization focusing, in accordance with various embodiments.

FIG. 4A shows an embodiment of an example tool 405 operable as a sensing system in an induction system to provide polarization focusing. The tool 405 can be used in a system identical to or similar to system 300 of FIG. 3. The tool can be controlled in the induction system to provide a mechanism to achieve a multi-pole sensing system. The tool 405 can be comprised of transmitting sensor arrays and receiving sensor arrays in multiple stations. Each station may be composed of a multitude of sensors that are in different orientations or that are operated with different signal amplitudes. The transmitter stations and the receiver stations can be operated in a paired arrangement. Each transmitting and receiving station pair, effectively, can produce a single or a combination of higher order azimuthal modes in sensitivity. Examples of some modes are shown in FIG. 2.

Multiple stations can be used to achieve different depth of detection and can enhance sensitivity in the radial direction. Sensors at each station may be uniformly or non-uniformly disposed around a circumference of the tool structure on which the sensors are disposed. The sensors may also form arbitrary two-dimensional (2D) or 3D arrays. Even though achieving higher azimuthal modes in sensitivity may rely on a specific relationship between transmitting and receiving sensor positions, orientations, and strengths, there can be an infinite number of such arrangements. Each sensor can be realized as a magnetic dipole, an electric dipole, or an electrode.

In order to excite higher-order azimuthal modes, orientations of the dipoles in each substation can be varied, where an example is shown in FIGS. 4B-4C. In an embodiment, all sensors may be fed with a single wire and alternating the winding direction of the wire as shown in the sensor feed illustrated in FIG. 4B. This allows a natural balance between different sensors strengths, since substantially the same current can pass through each sensor. Separate wires can also be used for each sensor, as shown in the sensor feed illustrated in FIG. 4C. This can allow explicit control of the sensor strengths and help compensate for manufacturing differences between sensors.

Magnetic dipoles can be realized using either coils or solenoids. Realizations of electric dipoles can include wire antennas, toroids, or electrodes. Due to the linearity of electromagnetic wave phenomenon in earth formations, dipoles in different orientations can be synthetically combined after a measurement to produce signals from hypothetical dipoles in different orientations. A configuration that uses this is the tilted coil configuration. Moreover, due to reciprocity, the roles of transmitter and receivers can be interchanged without any change in the properties of the physics of the application being addressed. A depth shift can be applied to signals from transmitter-receiver station pairs that are not collocated and that have substantially the same transmitter-receiver separation. The depth shift can be adjusted to ensure different pairs are sensitive to substantially the same volume of formation.

Sensitivity of a sensor system that is composed of a transmitter and a receiver is a product of the spatial transmission pattern of the transmitter and spatial reception pattern of the receiver. As a result, in order to have azimuthal sensitivity in the system, at least one of the transmitter or receiver has an azimuthal transmission/reception pattern. It can be observed that having azimuthal transmission/reception pattern for the sensors (for example via multi-pole antennas) does not directly lead to having a corresponding azimuthal sensitivity for the combined transmitter-receiver system. In fact, specific relationships between transmitter and receiver sensor positions and orientations are used to achieve deep high-order azimuthal sensitivity.

Figures 5A, 5B, 5C:
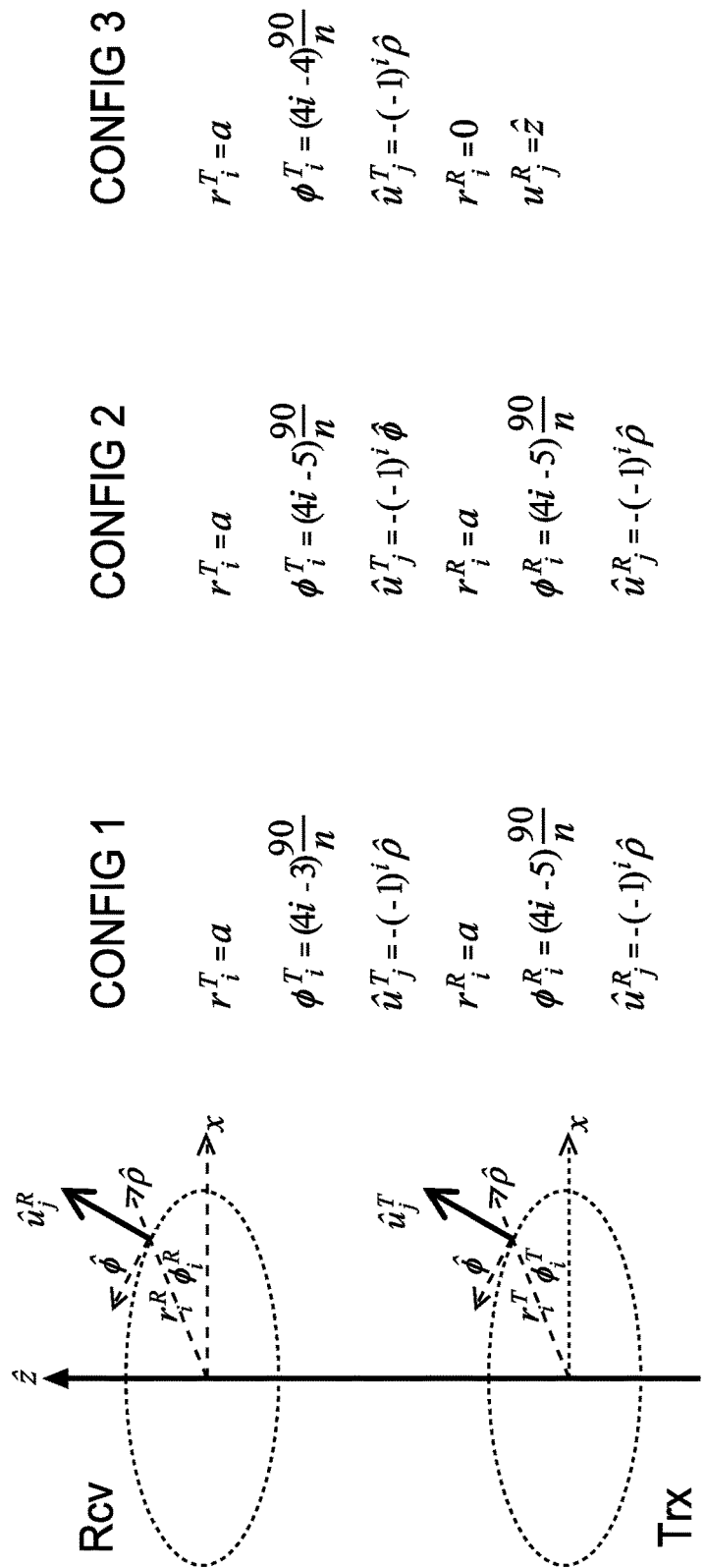
FIGS. 5A-5C show three example sensor configurations that can achieve $n^{th}$ order azimuthal sensitivity, in accordance with various embodiments.

FIGS. 5A-5C show three example sensor configurations that can achieve $n^{th}$ order azimuthal sensitivity. Each arrangement is comprised of n transmitting dipole sensors. FIG. 5A and FIG. 5B show two sensor arrangements comprised of n receiving dipole sensors in an addition to n transmitting dipole sensors. The third sensor arrangement, shown in FIG. 5C, is comprised of only one receiving sensor in an addition to n transmitting dipole sensors. The single receiving sensor of the third sensor arrangement is disposed along the axis of the tool. In FIGS. 5A-5C, $r_i^T$, $\phi_i^T$, $u_i^T$, $r_i^R$, $\phi_i^R$ and $u_i^R$ denote radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees and orientation vector of the $i^{th}$ receiver. An orientation vector is a vector in the direction of the dipole of the sensor. The vectors $\hat{\rho}$, $\hat{\phi}$ and $\hat{z}$ are the unit vectors in cylindrical coordinates along radial, azimuthal, and z-directions. Since the orientation vector relates to direction only, an orientation vector $u_i$ is a unit vector $\hat{u}_i$. The parameter a is the radius of the circle where the sensors are disposed, that is, it is the radius of a tool structure on which the sensor is disposed with the tool structure having a cylindrical shape. All of the dipoles in these arrangements can be of equal strength. FIGS. 5A-5C provide only examples and different arrangements can be achieved with the same effect by making modifications on sensor setup. These modifications can include changing the position, orientation, strength of the dipoles, or combinations thereof.

Figure 6:
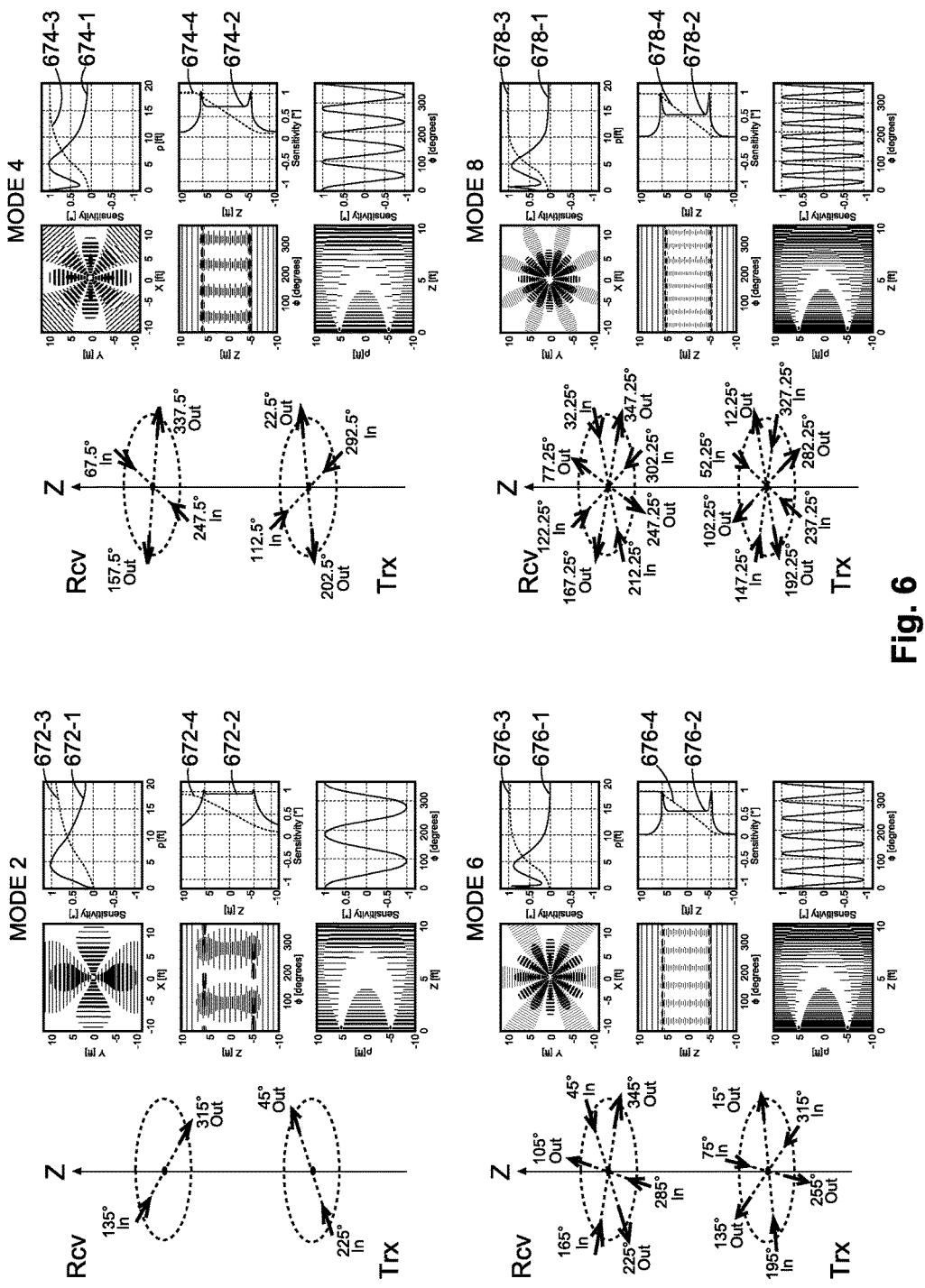
FIG. 6 shows example sensor positioning and sensitivity for different modes corresponding to the arrangement shown in FIG. 5A, in accordance with various embodiments.
Figure 7:
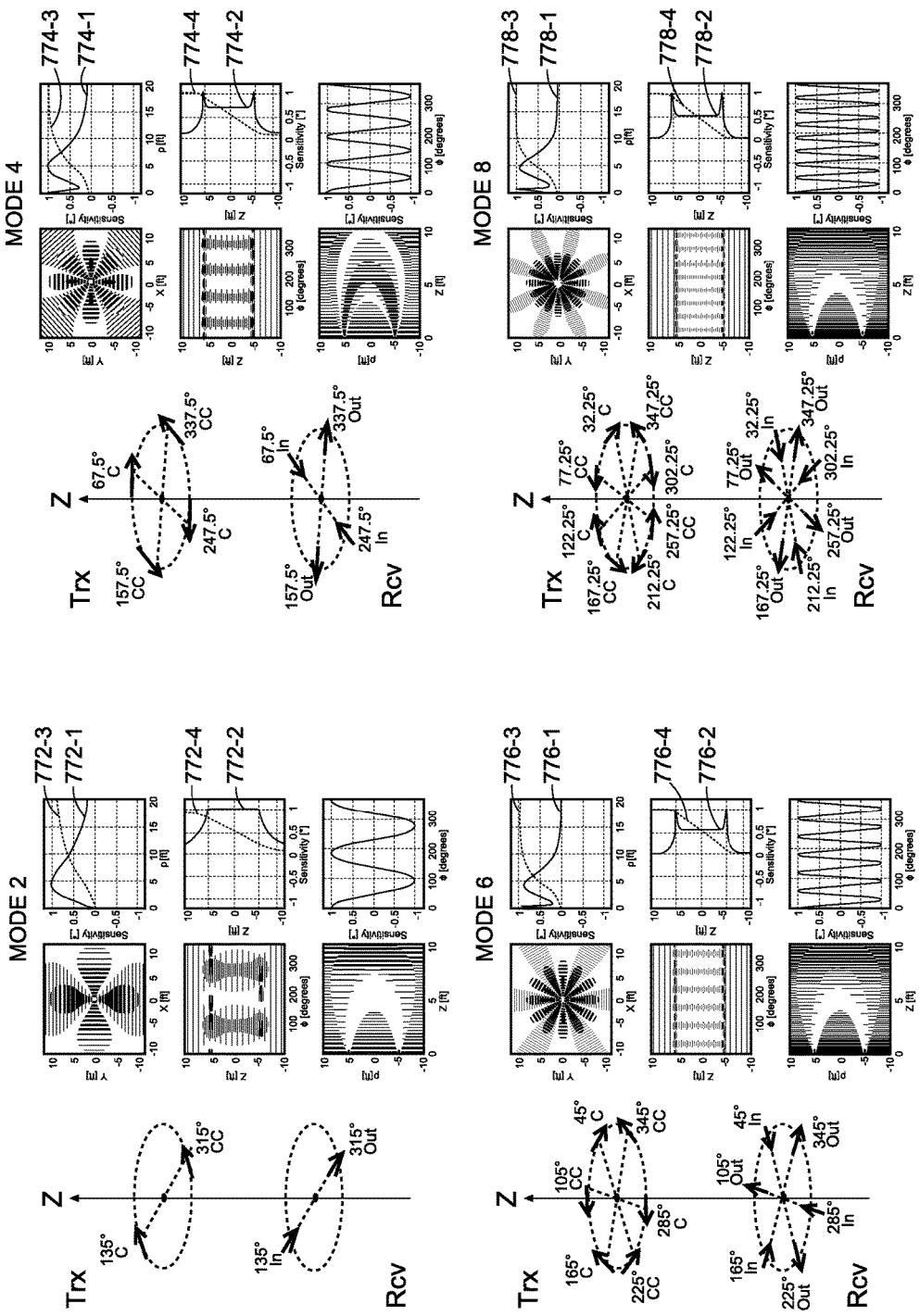
FIG. 7 shows example sensor positioning and sensitivity for different modes corresponding to the arrangement shown in FIG. 5B, in accordance with various embodiments.
Figure 8:
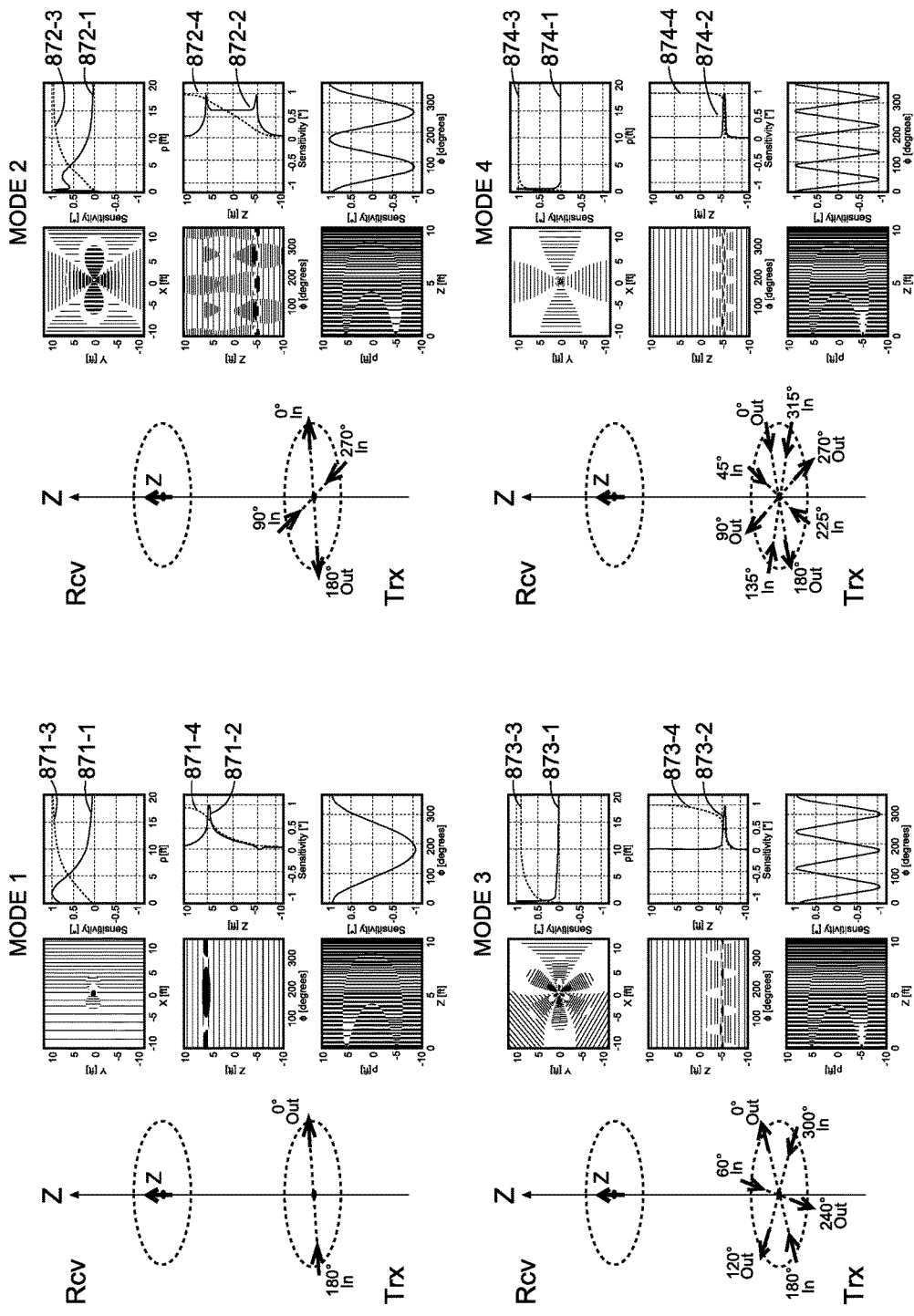
FIG. 8 shows example sensor positioning and sensitivity for different modes corresponding to the arrangement shown in FIG. 5C, in accordance with various embodiments.

FIGS. 6-8 show the sensor positioning and sensitivity for different modes for the three arrangements shown in FIGS. 5A-5C, respectively. Within each figure, there are four subfigures showing different modes. Mode number is indicated above the subfigures. On the left-hand side of subfigures, sensor position and orientation are shown. "In" and "Out" denote sensors pointing inside and outside the circumference of the tool structure on which the sensors are mounted, respectively. "C" and "CC" denote sensors pointing clockwise and counter clock-wise around the circumference of the tool structure, respectively. For each mode, the sensitivity in two dimensions is plotted next to its sensor positions and orientations and the sensitivity in one dimension (1D) is plotted to the right of the 2D patterns. The data generating the 2D subplots can be categorized or assigned to colors so that a display of the data generating the 2D subplots indicates the magnitude of sensitivity by color, for example using red for positive and blue for negative.

Curves 672-1, 672-2, 674-1, 674-2, 676-1, 676-2, 678-1, and 678-2, in the 1D subplots of FIG. 6 indicate the geometric factor. Curves 672-3, 672-4, 674-3, 674-4, 676-3, 676-4, 678-3, and 678-4 in the 1D subplots of FIG. 6 indicate the integrated geometric factor. Curves 772-1, 772-2, 774-1, 774-2, 776-1, 776-2, 778-1, and 778-2, in the 1D subplots of FIG. 7 indicate the geometric factor. Curves 772-3, 772-4, 774-3, 774-4, 776-3, 776-4, 778-3, and 778-4 in the 1D subplots of FIG. 7 indicate the integrated geometric factor. Curves 871-1, 871-2, 872-1, 872-2, 873-1, 873-2, 874-1, and 874-2, in the 1D subplots of FIG. 8 indicate the geometric factor. Curves 871-3, 871-4, 872-3, 872-4, 873-3, 873-4, 874-3, and 874-4 in the 1D subplots of FIG. 8 indicate the integrated geometric factor. In the simulations for tools of operating according to the configurations in these figures, one transmitter station and one receiver station are separated axially by 10 ft with sensor radius a=4 inches with a frequency 25 KHz used. Reference phase of all arrangements and modes was chosen as 0°, therefore maximum positive sensitivity is observed in all cases at 0°. It is possible to rotate both the transmitters and the receivers to achieve a different phase in excitations. In general, two different phases for the same mode are used to recover phase and amplitude information for a single mode.

Azimuthal sensitivity in all of the arrangements of FIGS. 5A-5C is clearly seen in the top-most 2D subplots of FIGS. 6-8, while the bottom-most 1D subplots of FIGS. 6-8 show a sinusoidal pattern. The radial sensitivity, as shown in the top-most 1D subplot of FIGS. 6-8, indicates how deep the system is sensing. It is observed that the first two arrangements (FIGS. 5A and 5B) can produce deep sensing, while for the third arrangement (FIG. 5C) sensing depth decreases with increasing azimuthal modes. The middle 1D subplots of FIGS. 6-8 shows the axial (z-)sensitivity, which corresponds to the vertical resolution of the tool. It is usually desirable to have a small width in axial sensitivity plot for increased vertical resolution. However, narrow large peaks on wide plateaus of the middle 1D subplot indicate the so-called horn effect, which is generally undesirable. It can be seen from the figures that the first two arrangements (FIGS. 5A and 5B) show some acceptable horn effect. The last arrangement (FIG. 5C) does not show any horn effect and it has larger vertical resolution.

In general, operation of the tool makes use of a combination of multiple (N) high order azimuthal modes $\{n_1, n_2, \ldots n_N\}$. See, for example, FIG. 2, which indicates how to achieve azimuthal resolution by combining modes. In an example embodiment, a superposition of arrangements in FIGS. 5A-5C with different n can be used as the sensor arrangement. Moreover, two or more ($N_\phi$) different azimuthal phases for the same mode can be used to diversify information. By azimuthal phase, it is meant that the same mode measurement is taken but with the tool, both transmitter and receiver, rotated. This rotation may be applied by physically rotating the tool, or by providing a separate set of sensors for the second phase. Providing a separate set of sensors for the second phase may almost double the total number of sensors. Multiple phases can be especially useful in azimuthal focusing of the signal. The total number of sensors in this case will be a sum of the number of sensors for all n=$\{n_1, n_2, \ldots n_N\}$ times $N_\phi$ minus the sensors that can be shared between different modes and phases.

Multi-pole excitation may achieved by introducing azimuthal variation on a single sensor. An example of such variation includes varying the density of windings azimuthally on a toroid. In that case, a single sensor may be adequate to create higher order azimuthal modes. In addition, multi-pole excitation may be achieved by subtracting the signal from a secondary station at a different axial position as bucking for reducing unwanted mode contributions such as the direct signal between transmitter and receiver. The concept of bucking is well known and will not be discussed here.

A second pre-processing approach for a system can include taking the ratio of signals from two different stations that obtain information from the same mode. By taking the ratio, effect of electronics drift or tool body interference may be eliminated. An approach that takes a ratio to eliminate such effects has been used for logging-while-drilling (LWD) propagation induction tools and can be applied to embodiments of a system of multi-poles in an induction system to provide polarization focusing. The use of a bucking approach and a ratio approach may also double the number of sensors used in the system.

The arrangements shown in FIGS. 5A and 5B can produce azimuthal sensitivity only for even numbers of azimuthal modes n, while the arrangement of FIG. 5C can produce azimuthal sensitivity for both even and odd numbers of n. Being able to only use even numbers of modes translates to a 180° azimuthal ambiguity in the spatial domain. The two arrangements shown in FIGS. 5A and 5B allow deep sensing but have 180° degree ambiguity. The third arrangement, shown in FIG. 5C, does not allow deep sensing; however, it does not suffer any ambiguity. A combination of these types of arrangements can allow both deep sensing and partial or full resolution of azimuthal ambiguity in the sensing system.

Figures 9A, 9B, 9C:
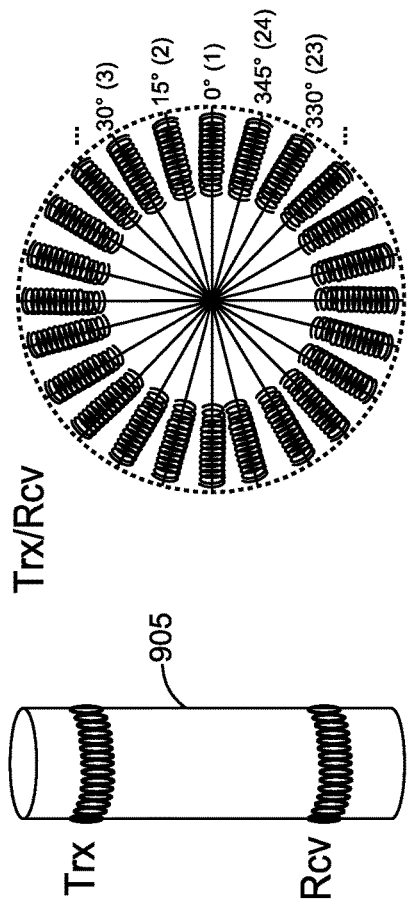
FIG. 9A illustrates an example a multi-pole induction tool via individually controlled coils, in accordance with various embodiments.
FIG. 9B shows a top down view of the individual coils around the circumference of the multi-pole induction tool of FIG. 9A, in accordance with various embodiments.
FIG. 9C shows, in table form, example excitation polarities used for different modes to apply to the coils of the multi-pole induction tool of FIG. 9A, in accordance with various embodiments.

FIG. 9A illustrates an embodiment of an example a multi-pole induction tool 905 via individually controlled coils. The tool 905 can be used in a system identical to or similar to system 300 of FIG. 3. FIG. 9B shows a top down view of the individual coils around the circumference of the multi-pole induction tool of FIG. 9A. The polarity of these coils can be electrically controlled. FIG. 9C shows, in table form, an embodiment of example excitation polarities used for different modes to apply to the coils of the multi-pole induction tool 905. The label M refers to mode and the label P refers to phase. The labels M and P are used in various of the figures associated with a transmitting sensor (Trx) and a receiving sensor (Rcv). As mentioned above, P can be limited to phase 1 or phase 2 to remove azimuthal ambiguity in the spatial domain of the measurements. Though FIGS. 9B and 9C show 24 sensors in the tool, the tool may have more or less than 24 sensors.

All sensors of the tool can be activated at the same time and with the same frequency. However, they can also be activated at different times and with different frequencies, then synthetically summed in a processing unit. In one approach, all modes (the whole table) can be excited at the same time with the same frequency, and with the scaling K given in equation (2). This can physically produce a directionally sensitive system. In a second approach, all modes (the whole table) can be excited at the same time with different frequencies with arbitrary scaling. In processing, all modes with multipliers provided by K given in equation (2) can be summed. This approach synthetically produces a directionally sensitive system. In a third approach, each mode (two rows of the table) can be excited at different times with arbitrary frequencies and with arbitrary scaling. In processing, all modes with multipliers provided by K given in equation (2) can be summed. This approach synthetically produces a directionally sensitive system.

Figures 10A, 10B, 10C:
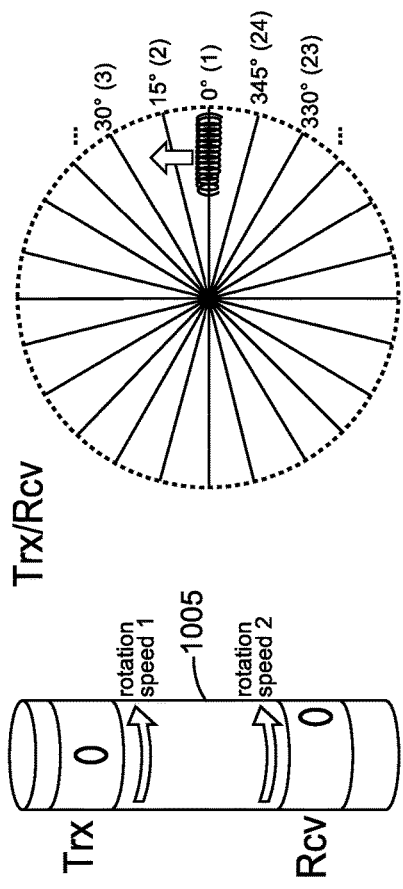
FIG. 10A illustrates an embodiment of an example a multi-pole induction tool that uses rotating coils, in accordance with various embodiments.
FIG. 10B shows a top down view of the individual coil of FIG. 10A as it is rotated around the circumference of the multi-pole induction tool, in accordance with various embodiments.
FIG. 10C shows, in table form, example excitation polarities used for different modes to apply to the coils of the multi-pole induction tool at different angular positions, in accordance with various embodiments.

FIG. 10A illustrates an embodiment of an example a multi-pole induction tool via rotating coils. The tool 1005 can be used in a system identical to or similar to system 300 of FIG. 3. FIG. 10B shows a top down view of the individual coil as it is rotated around the circumference of the multi-pole induction tool 1005 of FIG. 10A. The polarity of this coil can be electrically controlled. The polarity of the coil can be selected according to its position as it rotates around an axis of the tool 1005. Though FIG. 10B only shows one coil being rotated, both the transmitter coil and the receiver coil can be rotated. The coils can be rotated at the same rotation rate. Alternatively, the transmitter coil can be rotated with a first rotation speed and the receiver coil can be rotated with a second rotation speed, where the first rotation speed is different from the second rotation speed. With the transmitter and receiver rotated, the tool sonde can be held stationary.

FIG. 10C shows, in table form, an embodiment of example excitation polarities used for different modes to apply to the coils of the multi-pole induction tool at different angular positions around the circumference of the tool structure on which the coil is mounted. The label M refers to mode and the label P refers to phase. The labels M and P are used with each transmitting sensor (Trx) and each receiving sensor (Rcv). As mentioned above, P can be limited to phase 1 or phase 2 to remove azimuthal ambiguity in the spatial domain of the measurements. Though FIGS. 10B and 10C show 24 angular positions in the tool, the coil of the tool may be rotated to more or less than 24 angular positions.

In the multi-pole induction tool via rotating coils, the tool may be operated using only a single transmitter sensor and single receiver sensor. This embodiment can be realized by having only one transmitter and one receiver in one or more stations. Alternatively, the single transmitter and single receiver architecture can be realized with a number of transmitter sensors and a number of receiver sensors in which only one transmitter sensor is activated to transmit and only one receiver sensor is activated to acquire a signal in response to the transmission. A measurement can be made the following manner. The upper antenna housing is rotated to a first direction i. The lower antenna housing can be rotated to a second direction j. Measurement $M_{ij}$ can be obtained with the two antenna sensors at these positions. This two rotation and measure process can be repeated for all i=1 . . . N, j=1 . . . N. To obtain a result for a particular mode, a summation can be performed according to the operation $$\Sigma(M_{ij} \times S_{ti} \times S_{rj}),$$

where $S_{ti}$ is the sign (+1 or −1) of the transmitter associated with the mode, $S_{rj}$ is the sign (+1 or −1) of the receiver associated with the mode. A hybrid of a multi-pole induction tool via individually controlled coils and multi-pole induction tool via rotating coils can be implemented by placing multiple antennas in the upper housing and multiple antennas in the lower housing and operating the hybrid using excitations similar to those in FIGS. 9C and 10C.

Figure 11A:
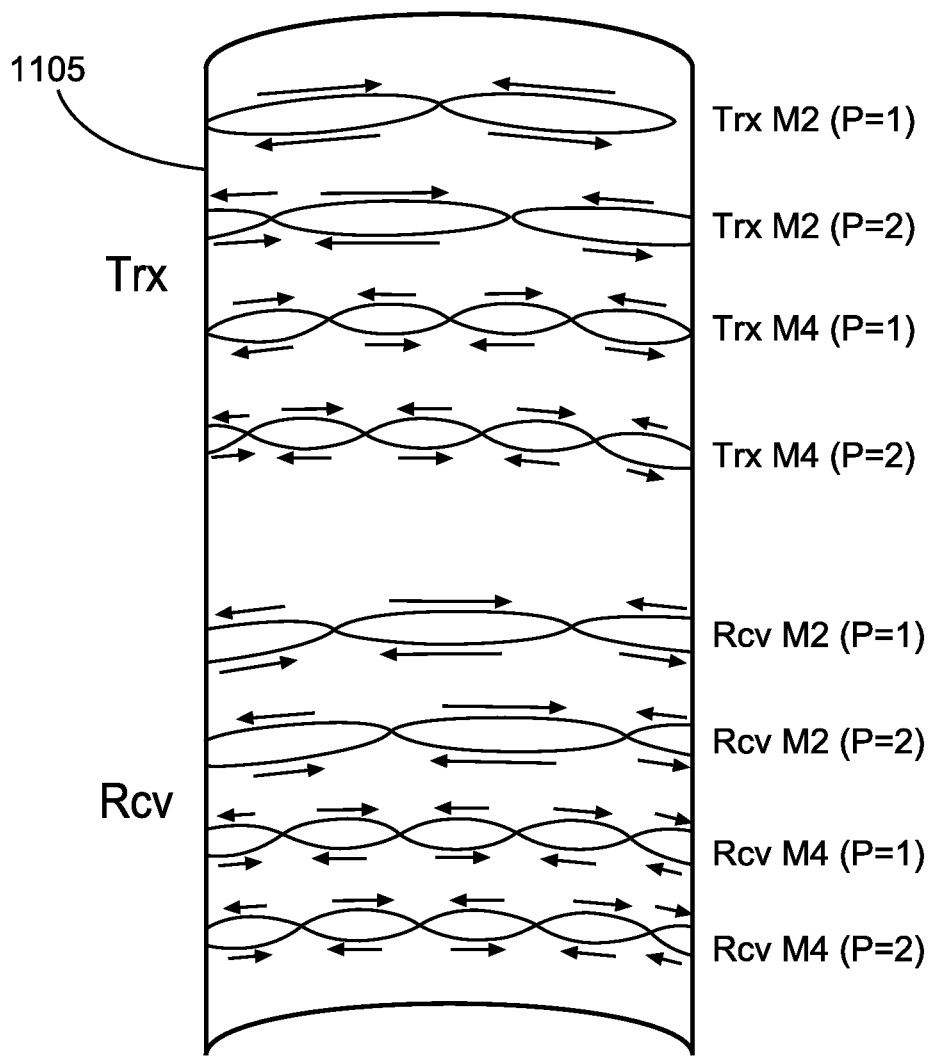
FIG. 11A illustrates an example a multi-pole induction tool via periodic wrapping, in accordance with various embodiments.

FIG. 11A illustrates an embodiment of an example a multi-pole induction tool 1105 via periodic wrapping. The tool 1105 can be used in a system identical to or similar to system 300 of FIG. 3. The wrappings around the tool can be arranged as periodic structures on the surface of the tool structure on which the wrapping sensors are mounted. The periodic wrapping can include a transmitter wire and a receiver wire operatively controlled as a pair. Each periodic wrapping disposed around the tool structure can include a first portion and a second portion, where the second portion can be directed azimuthally back towards the first portion such that in operation current flows in a same azimuthal direction in the first portion and in the second portion. The current flow is shown by the arrows in FIG. 11A.

The view in FIG. 11A shows a cylindrical tool surface after cutting it axially and opening it up. In operation, the right side of tool 1105 is connected to the left side of tool 1105. The periodicity can be provided as a wrapping path extending above, below, or above and below a plane perpendicular to the longitudinal axis of the tool structure of tool 1105. As the wrapping is disposed azimuthally around tool 1105, its position in the z-direction along the axis of tool 1105 varies periodically. The periodic variation is subject to manufacturing tolerances. The tool 1105 is not limited to a cylindrical tool structure. Though sinusoidal shapes are shown in FIG. 11A, shapes other than sinusoidal can be used, such as triangular, rectangular, or other periodic structure.

Figure 11B:
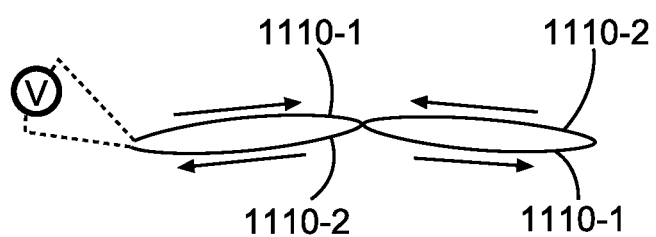
FIG. 11B shows an example periodic wrapping coupled to an excitation source, which can be used on the tool of FIG. 11A, in accordance with various embodiments.

FIG. 11B shows an example periodic wrapping coupled to an excitation source V, which can be used on the tool of FIG. 11A. The periodic wrapping can include first portion 1110-1 and a second portion 1110-2, where the second portion 1110-2 can be directed azimuthally back towards the first portion 1110-1 such that in operation current flows in a same azimuthal direction in the first portion 1110-1 and in the second portion 1110-2. As with FIG. 11A, the view in FIG. 11B is provided with the tool surface after cutting it axially and opening it up. With the wrappings disposed on operable tool 1105, the right end shown in FIG. 11B almost touches left end shown in FIG. 11B. With the right end moved to almost touch the left end, it can be seen that the current flows in the same azimuthal direction, as the current arrows align. The example wrapping of FIG. 11B can be realized as a single continuous wire. The second portion 1110-2 can be shifted 180° from the first portion 1110-1 with respect to the tool structure. Alternatively, each winding can be composed of multiple wires. Multiple wire segments can be concatenated to provide effectively a single continuous wire.

A multi-pole induction tool 1105 via periodic wrapping can be structured in a system with a control unit operatively coupled to the transmitter wire and to the receiver wire to selectively activate transmission from the transmitter wire and to selectively activate acquisition of a signal at the receiver wire in response to the transmission. The multi-pole induction tool via periodic wrapping can include two periodic wrappings on the tool structure 1105, each of the two periodic wrappings having a period different from each other. In another embodiment, the multi-pole induction tool via periodic wrapping can include a plurality of transmitter wires and a plurality of receiver wires operatively controlled as pairs, with each transmitter wire and each receiver wire disposed as a periodic wrapping around the tool structure. Each periodic wrapping can include a first portion and a second portion, with the second portion directed azimuthally back towards the first portion such that in operation current flows in a same azimuthal direction in the first portion and in the second portion. In the plurality of transmitter wires and the plurality of receiver wires, each transmitter periodic wrapping can have a period equal to a period of a receiver periodic wrapping to which it is operatively paired, where at least one pair having a period different from another pair in the plurality.

The control unit can be structured to be operable to selectively activate a transmitter wire and a receiver wire having the same periodicity of wrapping. The control unit can be structured to be operable to control the plurality of transmitter wires and the plurality of receiver wires as a plurality of transmitter—receiver pairs, the transmitter and the receiver of each transmitter—receiver pair having the same periodicity of wrapping. The transmitter wires and the receiver wires can be selectively controlled on a pair-wise basis.

The transmitter wires of a multi-pole induction tool can be disposed along a longitudinal axis of the tool structure in a sequential manner with respect to the periodicity of each transmitter. In addition, the receiver wires can be disposed along the longitudinal axis of the tool structure in a sequential manner with respect to the periodicity of each receiver. The sequential manner for both the transmitter wires and the receiver wires can be arranged from a largest period to a smallest period ordered by period size.

Figure 11C:
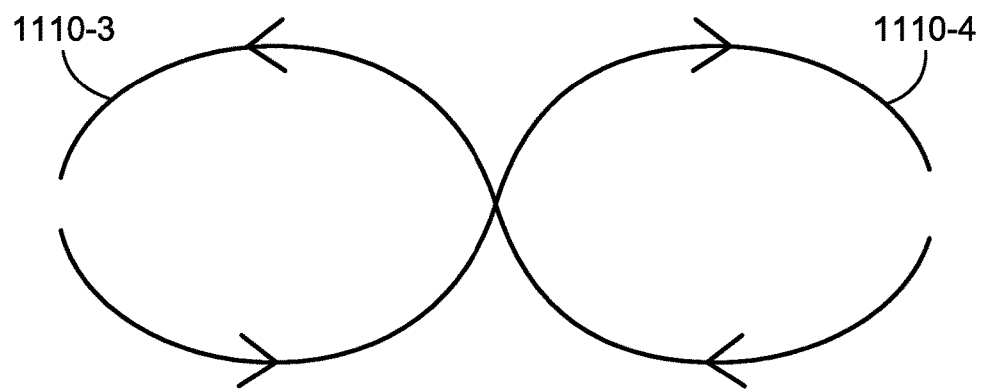
FIGS. 11C-11D show example periodic wrappings that can be used on the tool of FIG. 11A, in accordance with various embodiments.

FIG. 11C shows an example periodic wrapping, which can be used on the tool of FIG. 11A. FIG. 11C shows a construction with the first portion 1110-3 and the second portion 1110-4 structured as separate wires. The first portion 1110-3 can have two ends to couple to a first source and the second portion 1110-4 can have two ends to couple to a second source. The second portion 1110-4 can be 180° shifted from the first portion 1110-3 with respect to the tool structure.

Figure 11D:
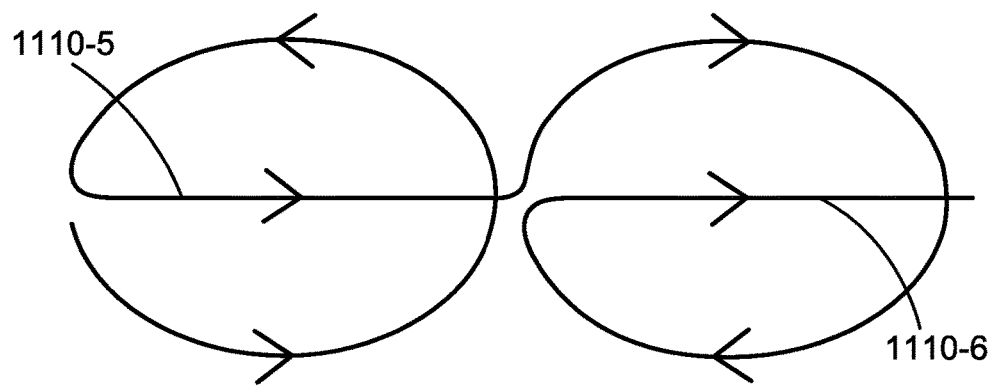

FIG. 11D shows another example periodic wrapping, which can be used on the tool of FIG. 11A. FIG. 11C shows a construction in which a periodic wrapping can include wiring 1110-5 and 1110-6 internal to the tool structure 1105.

The number of transmitting sensors and the number of receiving sensors structured as periodic wrappings, as shown in FIG. 11A, can be arranged to generate deep high-order azimuthal sensitivity. However, the structure of wrapping can be used in applications different from generating deep high-order azimuthal sensitivity. The periodic wrapping structure can be used in geosteering, mapping formation profile around a borehole, conducting a stress analysis around the borehole, or other downhole functions.

Figure 12:
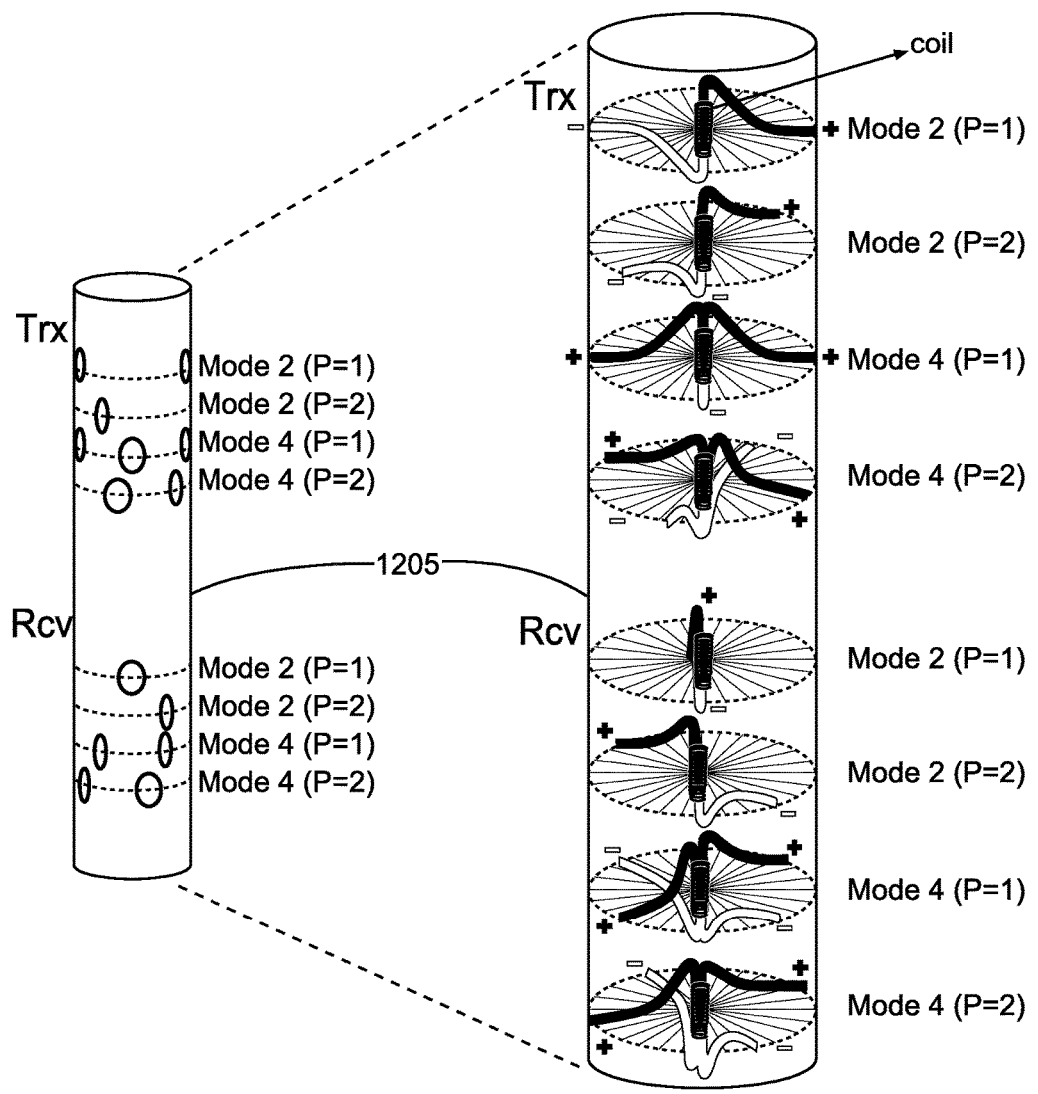
FIG. 12 illustrates an embodiment of an example a multi-pole induction tool via guided flux, in accordance with various embodiments.

FIG. 12 illustrates an embodiment of an example a multi-pole induction tool 1205 via guided flux. The tool 1205 can be used in a system identical to or similar to system 300 of FIG. 3. Coils with a high permeability core can be used to achieve high mode numbers and balancing. Depending on the dipole direction or position for a mode N that is of interested in, a high permeability core can be placed that opens outside at particular locations.

Figure 13:
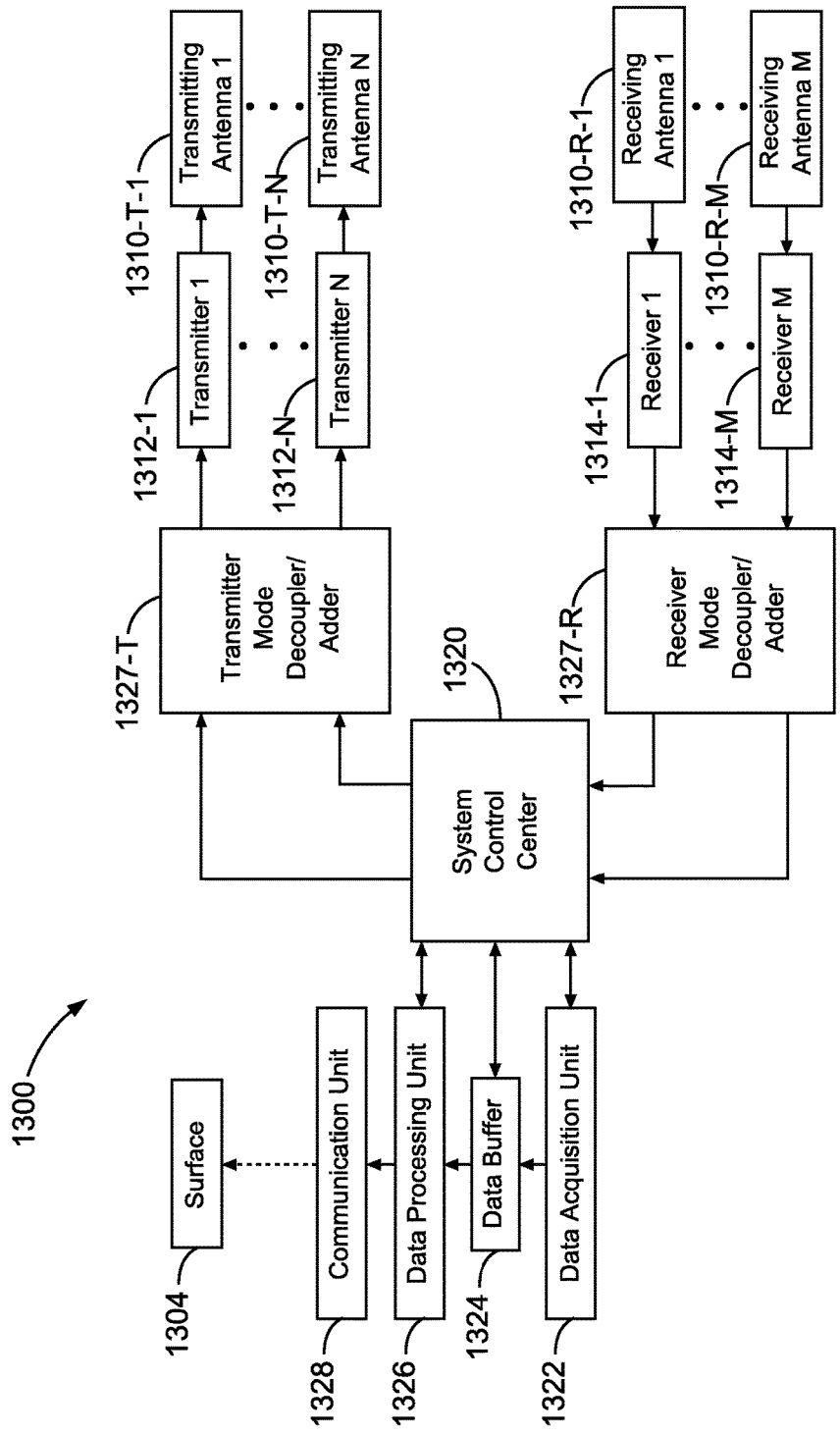
FIG. 13 shows a block diagram of an embodiment of a data acquisition system, in accordance with various embodiments.

FIG. 13 shows a block diagram of an embodiment of a system 1300, such as a data acquisition system, having a tool operable as a sensing system to provide polarization focusing with transmitting antennas 1310-T-1 . . . 1310-T-N and receiving antennas 1310-R-1 . . . 1310-R-M, operable in a borehole in which the tool is placed. System 1300 can include a system control center 1320, transmitters 1312-1 . . . 1312-N, receivers 1314-1 . . . 1314-M, a data acquisition unit 1322, a data buffer 1324, a data processing unit 1326, and a communication unit 1328 in addition to the tool with transmitting antennas 1310-T-1 . . . 1310-T-N and receiving antennas 1310-R-1 . . . 1310-R-M. System control center 1320 can include a central processing unit (CPU), analog electronics, digital electronics, or various combinations thereof to manage operation of other units of system 1300.

System control center 1320 can generate a signal and feed the signal to transmitters 1312-1 . . . 1312-N. The transmitters can be simultaneously or sequentially activated and they can be kept on for a time long enough to allow transients to die off and noise effects to diminish via stacking. The received signals can be transformed into a domain where incident portion of the signal can be separated from the reflected portion. The signals at the receivers are provided to system control center 1320, which can be stored at the data buffer 1324 before finally being communicated to the surface 1304.

System control center 1320 selectively activates the transmitting antennas 1310-T-1 . . . 1310-T-N and selectively receives the signal scattered from the formation at the receiving antennas 1310-R-1 . . . 1310-R-M. A mode decoupler can be used to ensure mode purity by separating different modes from mix modes. A mode adder can be used to produce a combination of modes that has directional azimuthal sensitivity, such as shown in FIG. 2. Due to reciprocity, both a transmitter mode decoupler/adder 1327-T can be applied to the transmitted signal and a receiver mode decoupler/adder 1327-R can be applied to the received signal. A signal with a certain transient or periodic signature is generated by the transmitting source. The receiver system operation may or may not be synchronized with the source activation. Synchronization may allow better control on the phase of the received signal if no ratios are being used in processing. A received transient signal can be digitized and recorded as a function of time, and it can be later converted to frequency with a Fourier transform operation. It can be alternatively passed through an analog band-passed filter so that only the response at a discrete set of frequencies is recorded. The signal received by the receivers can be stored in the data buffer 1324, processed, and if necessary, communicated to the surface.

Electromagnetic wave signals that are received at receiving antennas 1310-R-1 . . . 1310-R-M can be directed to corresponding receivers 1314-1 . . . 1314-M and system control center 1320. Operation of apparatus 1300 can include multiple frequencies being transmitted and received at the same time for better time utilization. In such an operation, a sinusoidal waveform, a square waveform, or other time-based waveforms may be used to excite multiple frequencies simultaneously at each transmitting antenna 1310-T-1 . . . 1310-T-N or individual frequencies at transmitter antennas 1310-T-1 . . . 1310-T-M. Received signals corresponding to the multiple frequencies can be separated by filters at the receiving end in data acquisition unit 1322. For each transmitting antenna 1310-T-1 . . . 1310-T-N, received signals at all receivers 1314-1 . . . 1314-M can be recorded. Data buffer 1324 can be used to store received signal for processing.

Data processing unit 1326 can be used to perform inversion or other processing on the data. The processing and the inversion can be continued in accordance with processing features similar to or identical to embodiments taught herein. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model. In various embodiments, an inversion process, conducted with respect to apparatus 1300, may be performed downhole or in an analysis unit, such as a computer, at surface 1304 after the data is transferred to surface 1304. Communication unit 1328 can communicate the data or results to surface 1304 for observation and/or determination of subsequent action to be taken in a drilling operation related to the measurements taken with apparatus 1300. The data or results may also be communicated to other tools downhole and used to improve various aspects of locating and extracting hydrocarbons.

Figure 14:
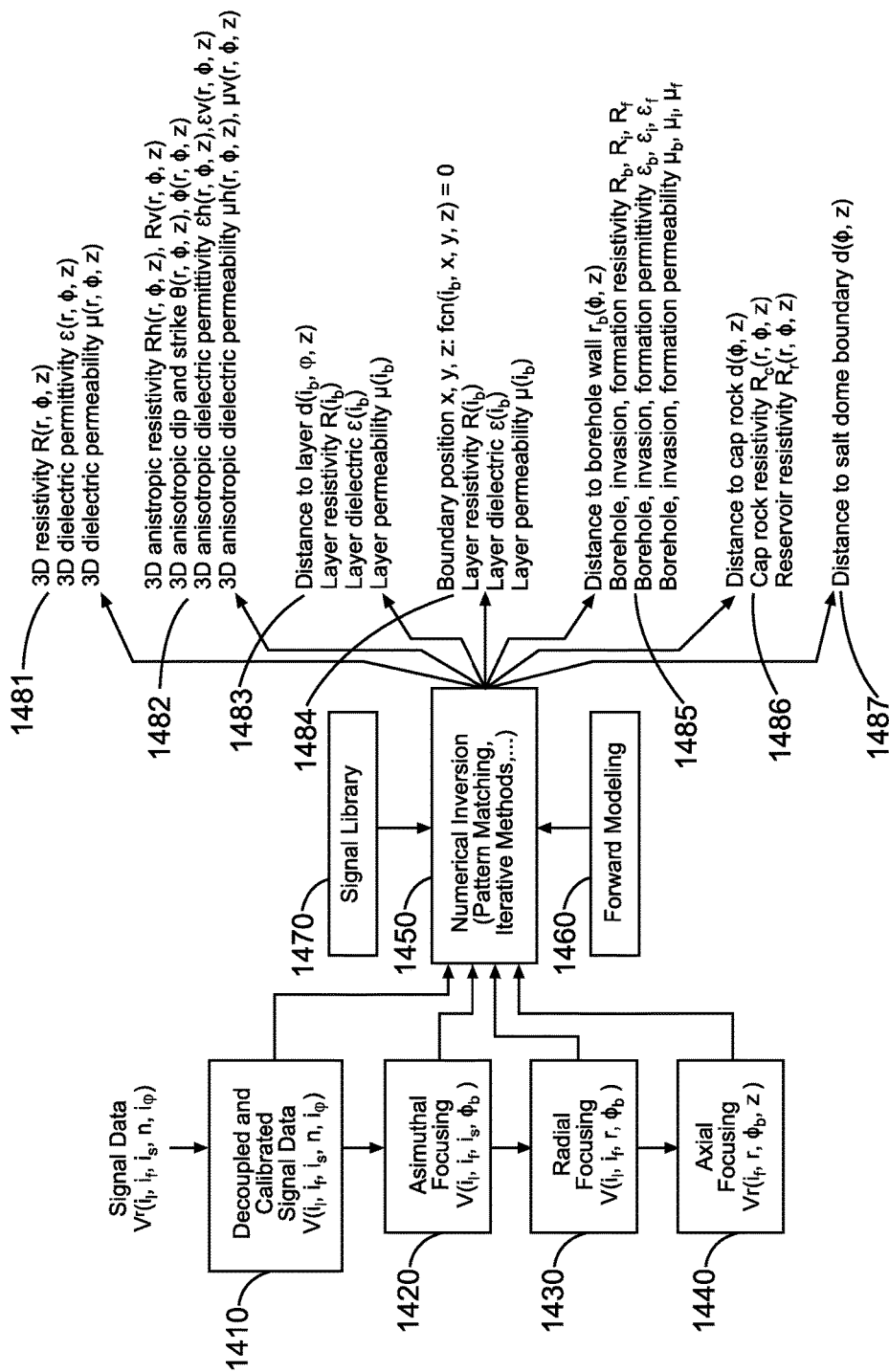
FIG. 14 shows an example processing methodology, in accordance with various embodiments.

FIG. 14 shows an embodiment of an example processing methodology. The signal obtained at the receivers are decoupled into different azimuthal modes and also calibrated to remove effects of electronics drift or amplification, at 1410. The signal is then azimuthally focused by utilizing a combination of azimuthal mode signals, at 1420. For some arrangements, such as configuration 1 of FIG. 5A and configuration 2 of FIG. 5B in FIGS. 6 and 7, respectively, since azimuthal sensitivity is the same at different radial distances from the tool, it can be successfully decoupled from the radial and axial dependence. The next step is radial focusing, and at this step, 1430, radial characteristics of the target are inverted by utilizing multiple station information. At the axial focusing stage, at 1440, axial variation in the formation is recovered.

Radial and axial focusing can be similar to the well known software focusing that is commonly used in standard array induction tools. Software focusing works best in a tool operating regime where skin depth can be ignored or successfully eliminated. A software focusing method can include generating probe signals and making measuring at selected locations and using linearity of the measuring environment to determine quantities being measured from known relationships between the generated entity (for example, a current or voltage to excite a transmitter) and measured property (voltage at a receiver) in the measuring environment. In cases where this is not satisfied, a brute force inversion, at 1450, can be used by utilizing a library, at 1470, or iterations with a forward method, at 1460. Inversion can include pattern matching, iterative methods, or other inversion techniques. Inversion methods for induction tools are well known and are not discussed further herein.

The order of focusing and inversion operations in FIG. 14 can be interchanged based on the used methodology.

The outputs of the focusing and inversion algorithm can be different in different type of applications of embodiments of a multi-pole tool. In the most general case, a 3D profile of resistivity $R(r, \phi, z)$, dielectric permittivity $\varepsilon(r, \phi, z)$, and dielectric permeability $\mu(r, \phi, z)$ can be obtained, as shown at 1481. In anisotropic formations, 3D horizontal and vertical properties of the formation such as anisotropic resistivity $Rh(r, \phi, z)$, $Rv(r, \phi, z)$, anisotropic dielectric permittivity $\varepsilon h(r, \phi, z)$, $\varepsilon v(r, \phi, z)$, anisotropic dielectric permeability $\mu h(r, \phi, z)$, $\mu v(r, \phi, z)$, and anisotropic dip and strike $\theta(r, \phi, z)$, $\phi(r, \phi, z)$ can be separately obtained, at 1482. This general 3D profiling may use a large number of stations to achieve the desired radial resolution.

A less demanding parameterization of the problem assumes that the formation is composed of non-circular concentric layers where formation properties are the same within each layer. In this case, properties of each layer and the distance to each layer as a function of azimuthal angle can be obtained as distance to layer $d(i_b, \phi, z)$, layer resistivity $R(i_b)$, layer dielectric $\varepsilon(i_b)$, layer permeability $\mu(i_b)$, at 1483. An alternative is to assume that the layers are stacked instead of being concentric to obtain boundary position x, y, z: $fcn(i_b, x, y, z)=0$, layer resistivity $R(i_b)$, layer dielectric $\varepsilon(i_b)$, and layer permeability $\mu(i_b)$, at 1484.

A tool embodiment can also be used to image near well-bore features, such as the distance of the borehole wall and invasion as distance to borehole wall $r_b(\phi, z)$, borehole, invasion, formation resistivity $R_b$, $R_i$, $R_f$, borehole, invasion, formation permittivity $\varepsilon_b$, $\varepsilon_i$, $\varepsilon_f$, borehole, invasion, formation permeability $\mu_b$, $\mu_i$, $\mu_f$ at 1485. In this case, distance between the transmitter and receiver may be chosen in the order of borehole diameter for optimization. In an LWD geosteering application, distance to a single layer can be mapped. In this case, the tool can be inside a reservoir, the shape of the boundary of the cap rock as a 3D image can be constructed and it can help keeping the tool within the most productive zone to provide distance to cap rock $d(\phi, z)$, cap rock resistivity $R_c(r, \phi, z)$, and reservoir resistivity $R_r(r, \phi, z)$, at 1486. In a geology with a salt dome, it may be possible to map the shape of the surface of the salt dome using distance to salt dome boundary $d(\phi, z)$, at 1487. In this case, the transmitting and receiving station may be placed at different wellbores.

Figure 15:
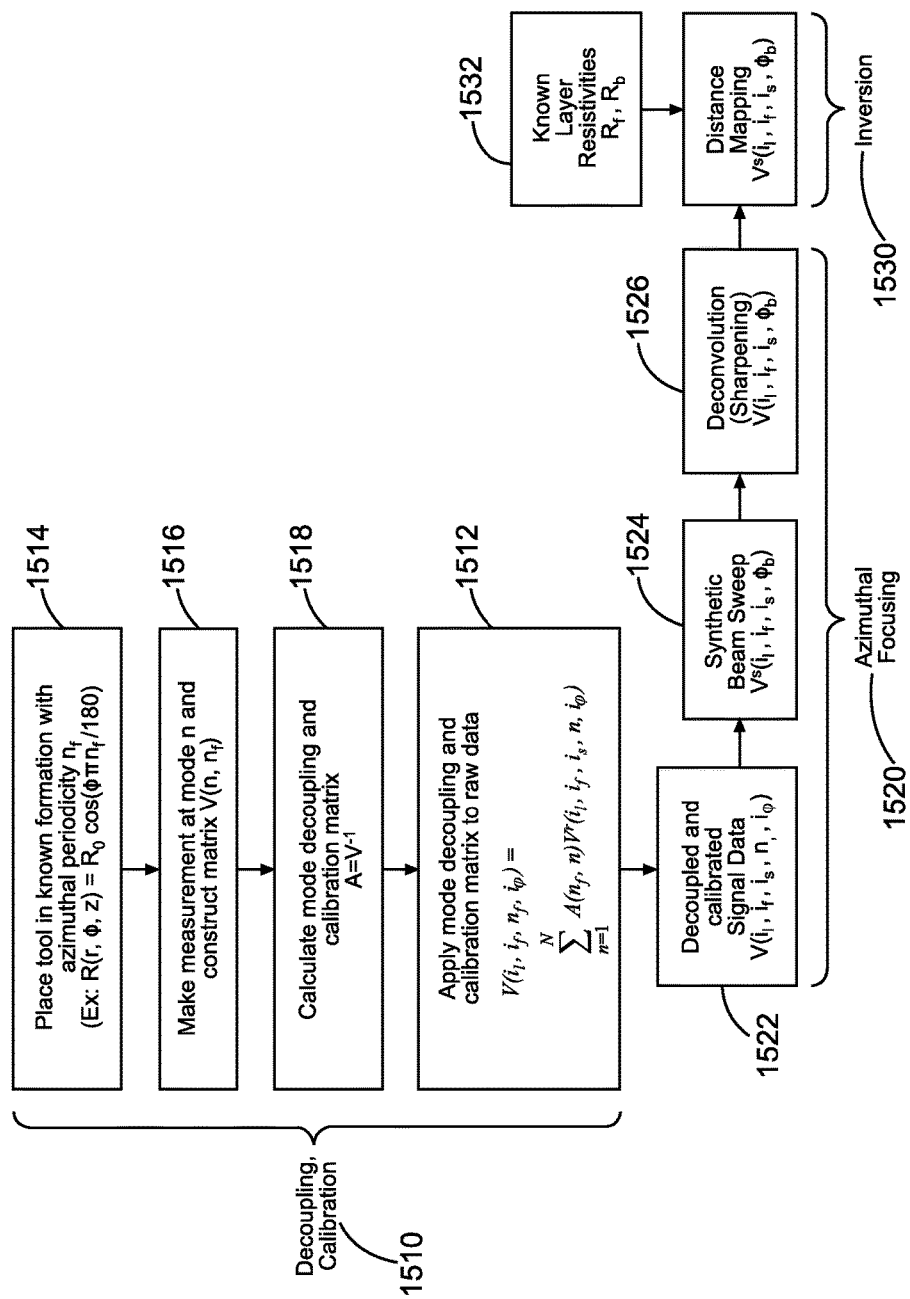
FIG. 15 shows an example processing methodology, in accordance with various embodiments.

FIG. 15 shows an embodiment of an example processing methodology. The following methodology may work best in cases where skin effect is low, which occurs when operating at lower frequencies, such as those in wireline tools. At 1510, a received signal is subjected to decoupling and calibration. The decoupling and calibration can be conducted by applying, at 1512, a mode decoupling and calibration matrix to raw data, as represented by $$V(i_l, i_f, i_s, n_f, i_\varphi) = \sum_{n=1}^{N} A(n_f, n) V^r(i_l, i_f, i_s, n, i_\varphi)$$

to provide decoupled and calibrated signal data, at 1522. At 1520, azimuthal focusing can be applied to the decoupled/calibrated data. The azimuthal focusing can be realized by applying a synthetic beam sweep, at 1524, to the decoupled and calibrated signal data. The results of the synthetic beam sweep can be subjected to deconvolution, at 1526. At 1530, inversion can be performed to provide distance mapping, where the inversion can be conducted using inputs of known layer resistivities, at 1532.

Due to design or imperfection of the transmitting system, a particular excitation may produce a combination of different azimuthal modes. A straightforward decoupling methodology can include characterizing mode interference in an air hang test, where only direct signal from the same mode is supposed to be observed. In this case, all transmitting modes are activated, and all modes are received. This activity provides a coupling matrix V for combinations of transmitting and receiving modes. The coupling matrix can be inverted and stored for later use in decoupling of the signals. An alternative that can also achieve calibration is to place the tool in different test media that are known to excite only particular modes, at 1514. One particular choice of such media is with resistivity $R(r, \phi, z) = R_0 \cos(\phi \pi n_f/180)$. This media ideally produces non-zero signal for the mode $n_f$, and produces zero for all other modes. At 1516, measurement at mode n can be made and a voltage response matrix, $V(n, n_f)$, can be constructed as a function of mode and azimuthal periodicity. At 1518, a mode decoupling and calibration matrix can be calculated. This calculated matrix can be generated as the inverse of the constructed voltage response matrix.

Figure 16:
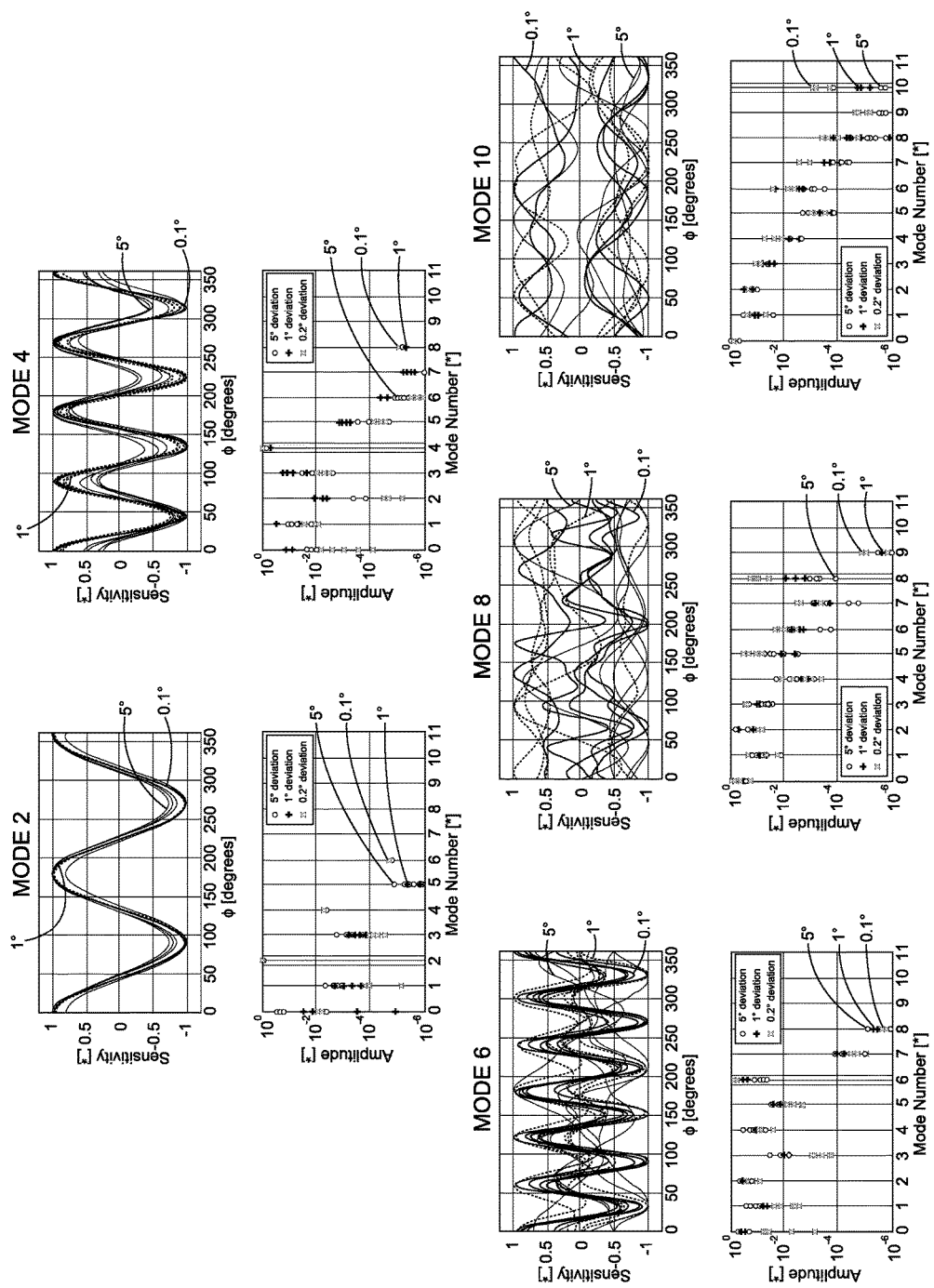
FIG. 16 shows mode mixing due to mechanical imperfection using simulated results, in accordance with various embodiments.

FIG. 16 shows mode mixing due to mechanical imperfection using simulated results with such reference formation for different test formation mode $n_f$. Azimuthal positions of the sensors are disturbed from their original positions randomly with 0.1°, 1°, and 5° standard deviation. The upper figure shows ten realizations of the sensor positions with the randomness as described above. The bottom figures show the amplitudes of the modes in the signal. The mode of the reference formation is shown in between the double lines. In the ideal case with perfect positioning and balancing between the sensors, only the mode in between the lines should exist and all other modes should be zero. However, as it can be seen from the bottom figures, small deviations in the tool manufacturing can also excite other modes as well. For example, in the case of reference formation mode 10, and a random deviation of 1°, mode 10 is excited with an amplitude range of $10^{-3}$ to $10^{-2}$. However, all modes from 1 up to 7 are excited with normalized amplitudes from $10^{-2}$ to 1. This means that the tool is producing a 1000 times larger unwanted signal, along with the desired $10^{th}$ mode signal. By calculating a coupling matrix $V(n,n_f)$ and inverting it, it is possible to decouple individual modes. This operation not only decouples modes, but also calibrates the signal strength and phase. It is possible to use other reference formation, such as a formation that is alternating between two values $R(r, \phi, z) = R_0 \operatorname{Sign}(\phi \pi n_f/180)$. This test formation distribution may be easier to manufacture and use in calibration of tool hardware. Calculation of decoupling and calibration matrix mentioned above can be applied before a logging job at the surface. It can also be applied downhole by embedding and moving a material that produces a reference signal within the tool body.

Since, each azimuthal mode provides one frequency in the azimuthal domain, it is possible to combine different modes to obtain a focused sensitivity pattern. The formulas below can be used for this purpose $$V_{(i_l, i_f, i_s, \phi_b)} = \sum_{n=1}^{N} \sum_{i_\varphi=1}^{N_\varphi} K_{i_f, i_s, n, i_\varphi} \operatorname{Re}\left(e^{i\left(\frac{\phi_b \pi n}{180} + P(i_\varphi)\right)}\right) \quad (1)$$

$$N_\varphi = 2$$

$$P(i_\varphi = 1) = \frac{\pi}{2}$$

$$P(i_\varphi = 2) = 0$$

$$K_{i_f, i_s, n, i_\varphi} = \begin{cases} \max_{\phi, z} |g(i_f, i_s, n, i_\varphi, R_{ref}, r_f, \phi, z)|, & \text{if } n \text{ is even;} \\ 0, & \text{otherwise.} \end{cases} \quad (2)$$

Here, V is the signal after azimuthal focusing, $i_l$, $i_f$ and $i_s$ are indices of logging depth, frequency, and spacing, $\phi_b$ is the focusing azimuth, N is the maximum azimuthal mode, $N_\phi$ is the number of different phases used in the tool arrangement for the same mode, P is the phase used with index $i_\varphi$, g is the Greens function that includes the tool and the reference formation as described in the decoupling stage above. The Greens function and associated coefficient K is only used for normalization purposes. Two phases $N_\phi = 2$ are enough to recover both amplitude and phase information associated with each mode.

Figure 17:
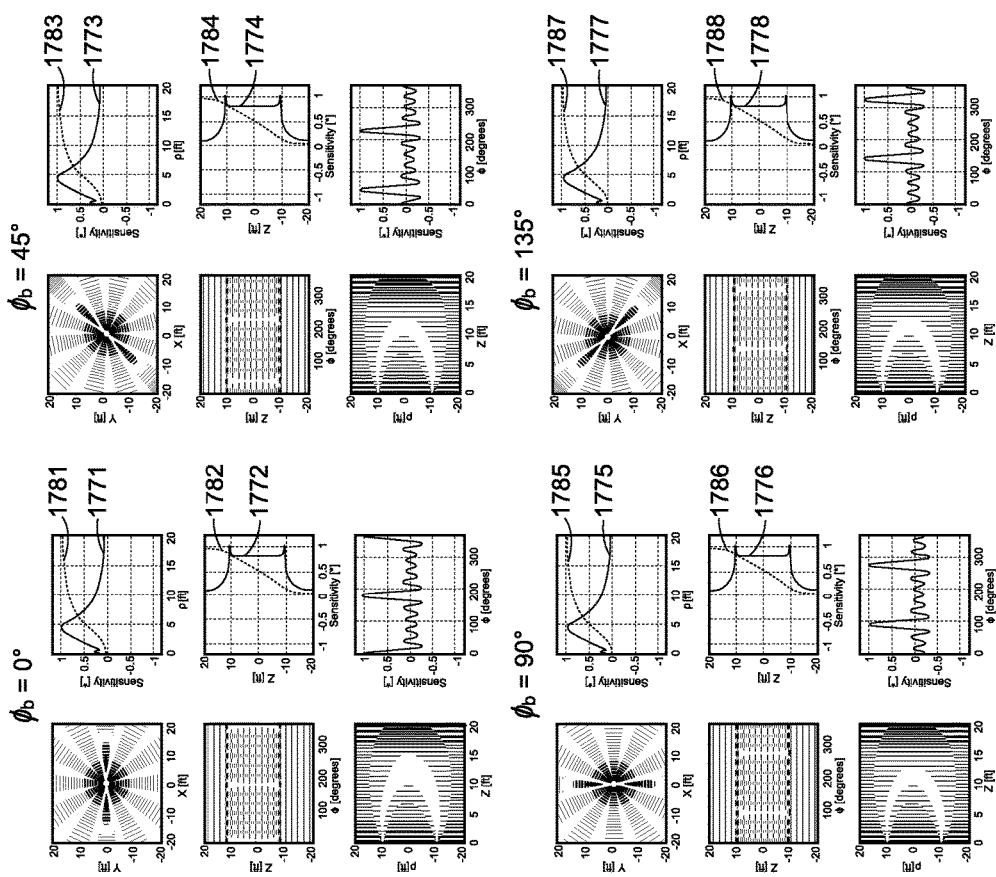
FIG. 17 shows azimuthal focusing results for different focusing azimuths, in accordance with various embodiments.

FIG. 17 shows the azimuthal focusing results for different focusing azimuths $\phi_b$. Curves 1771, 1772, 1773, 1774, 1775, 1776, 1777, and 1778, in the 1D subplots of FIG. 17 indicate the geometric factor. Curves 1781, 1782, 1783, 1784, 1785, 1786, 1787, and 1788 in the 1D subplots of FIG. 17 indicate the integrated geometric factor. It can be seen from the 2D figures and the 1D bottom-most figure that azimuthal focusing is successfully achieved.

By using different focusing azimuths, it is possible to scan the volume around the tool. A drawback to the processing above may include ripples that plague the azimuthal behavior. One way to remove the ripples is to utilize a deconvolution filter. This filter can be constructed by first considering the response of the tool in the case of a small step shaped (in azimuth) formation $R(r_{impulse}, \phi)$ with the definitions as below.

$$d(r, \phi) = \begin{cases} r(1), & \text{if } \frac{0}{N} < \frac{\phi \pi}{180} < \frac{1}{N} \\ \ldots & \ldots \\ r(i), & \text{if } \frac{i-1}{N} < \frac{\phi \pi}{180} < \frac{i}{N} \\ \ldots & \ldots \\ r(N), & \text{if } \frac{N-1}{N} < \frac{\phi \pi}{180} < \frac{N}{N} \end{cases} \quad (3)$$

$$R(r, \phi) = \begin{cases} R_f, & \text{if } r < d(r, \phi) \\ R_b, & \text{otherwise.} \end{cases} \quad (4)$$

$$r_{impulse} = \begin{bmatrix} 1 \\ 0 \\ \ldots \\ 0 \end{bmatrix} \quad (5)$$

Figure 18:
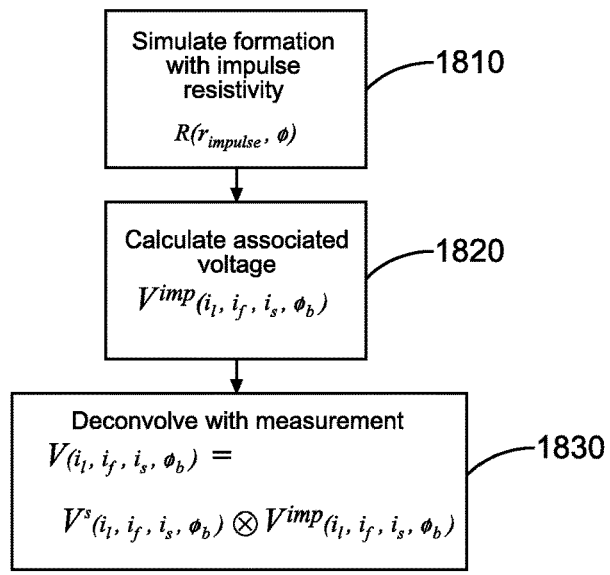
FIG. 18 illustrates example operations for deconvolution with respect to a response based on an impulse medium analysis, in accordance with various embodiments.

Here, $d(r, \phi)$ is the distance function as a function of a vector r and a scalar azimuth $\phi$. If the response of the tool to the impulse medium given above is $V_{imp}(i_l, i_f, i_s, \phi_b)$, the operations for deconvolution are shown in FIG. 18. At 1810, the formation is simulated with an impulse resistivity. At 1820, voltage associated with the impulse resistivity is calculated. At 1830, the calculated voltage is deconvolved with measurement voltage data.

For a single station transmitter/receiver tool, if a step formation profile with known resistivities and unknown distance is assumed, a table can be constructed to convert from voltage level at each focusing azimuth to a distance. Construction of the table can be performed by utilizing the Greens function in equation (2). With more information, more parameters can be obtained by inversion. If multiple transmitter or receiver stations are available, more parameters can be obtained and a 3D true formation resistivity map can be constructed.

Figure 19:
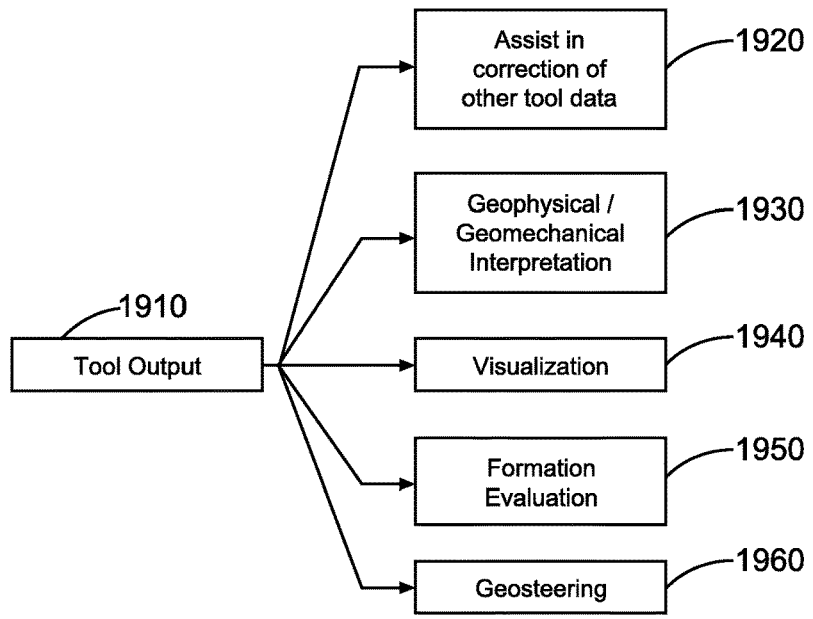
FIG. 19 illustrates applications for an example tool, in accordance with various embodiments.
Figure 20A:
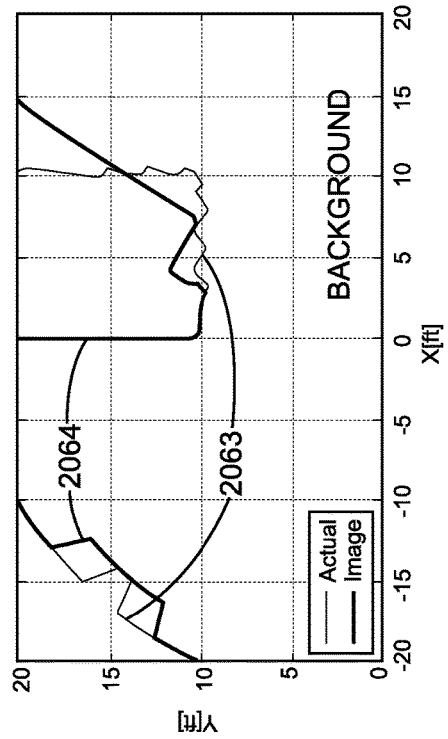
FIGS. 20A-20D show four different simulated cases on the deep imaging capability of an embodiment of a multi-pole tool, in accordance with various embodiments.
Figure 20B:
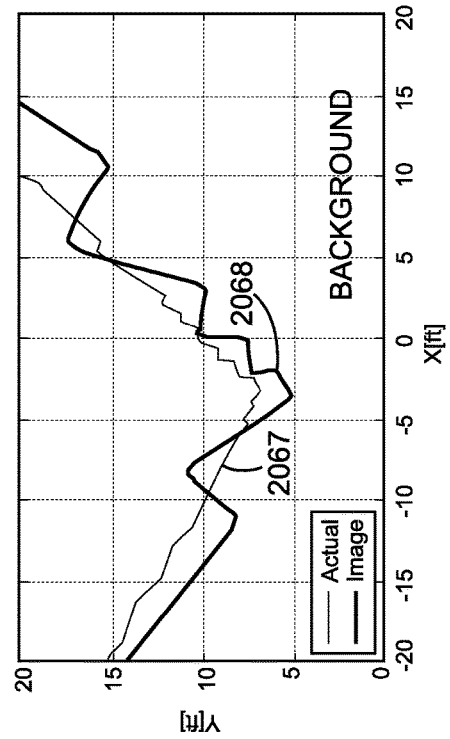
Figure 20C:
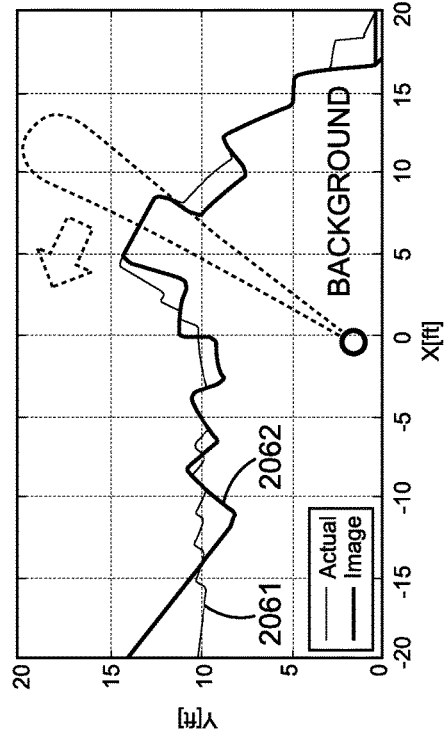
Figure 20D:
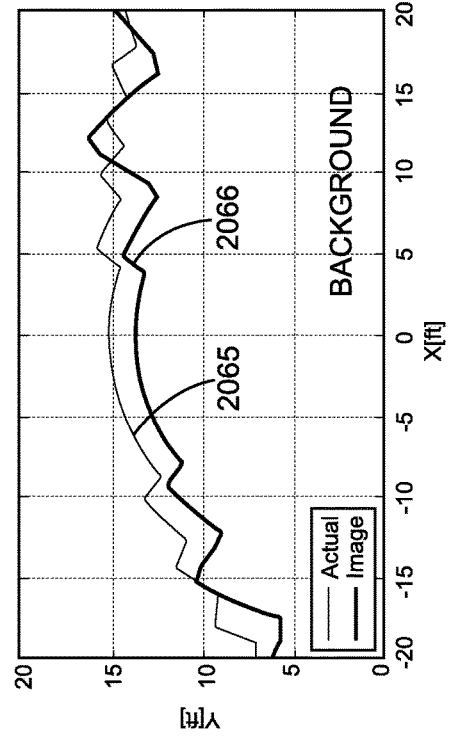

FIG. 19 shows applications for an embodiment of a tool as discussed herein. Such a tool can provide near-borehole properties of the formation and assist in correction of other electromagnetic tool data (at 1920). Inversion results can also be used in geophysical/geomechanical interpretation (at 1930), especially for deep reading, where spacing between transmitter and receiver is large (10 ft to 100 ft). With the tool output (at 1910), it is possible to construct true 3D images of the formation providing visualization (at 1940) and use it in general formation evaluation purposes (at 1950). In various embodiments, a multi-pole tool can also map layer boundaries around a reservoir and help optimize geosteering (at 1960).

In various embodiments, a tool based on multi-poles, as discussed herein, can achieve a large number of azimuthal modes. The tool can be implemented in subterranean applications to achieve deep azimuthal focusing of sensitivity. Deep 3D imaging of formations with azimuthal resolution higher than 20° may be obtained. The tool may significantly improve geological evaluation of formations and geosteering by accurately mapping layer boundary shapes. The tool may also map borehole and invasion profile much deeper than it can be achieved with the caliper or imaging tools.

FIGS. 20A-20D show four different simulated cases on the deep imaging capability of an embodiment of a multi-pole tool. For the simulation the background resistivity is taken to be 10 Ωm and shown in the 2D plots as blank. The resistivity of the formation being imaged is 1 Ωm. The processing methodology discussed with respect to FIG. 15 is used with 2, 4, 6, 8 and $10^{th}$ azimuthal modes and two phases as in equation (2). One transmitter station and one receiver station separated by 20 ft with a sensor radius a=4 in and a frequency of 25 KHz is used in the simulations. The resistivity profile is chosen z-independent in simulations. Curves 2061, 2063, 2065, and 2067 show the actual profile boundary, while curves 2062, 2064, 2066, and 2068 show the inverted image of the profile boundary. It can be seen from FIGS. 20A-20D that an embodiment of a multi-pole tool, as discussed herein, can successfully construct an image of the formations around the tool.

In various embodiments, a system can comprise: a number of transmitting sensors arranged on a tool structure; a number of receiving sensors arranged on the tool structure, the receiving sensor operable to acquire a signal in response to selective activation of the number of transmitting sensors, such that the number of transmitting sensors, the number of receiving sensors, or both the number of transmitting sensors and the number of receiving sensors include one or more sensors structured as a multi-pole sensor, and the number of transmitting sensors and the number of receiving sensors can be arranged to generate deep high-order azimuthal sensitivity; and a control unit arranged to control the selective activation of the number of transmitting sensors and to acquire signals selectively from the number of receiving sensors in response to the selective activation.

The number of transmitting sensors can include one or more multi-pole transmitter sensors and the number of receiving sensors can include one or more multi-pole receiver sensors, the one or more multi-pole transmitter sensors and the one or more multi-pole receiver sensors arranged to generate deep high-order azimuthal sensitivity. In addition, the number of transmitting sensors and the number of receiving sensors can be arranged to establish deep high-order azimuthal sensitivity by using a combination of magnetic dipoles. The number of transmitting sensors and the number of receiving sensors can be arranged to establish deep azimuthal focusing by using a combination of deep high-order azimuthal sensitivity modes.

The number of transmitting sensors and the number of receiving sensors can have an arrangement of n transmitting dipole sensors and n receiving dipole sensors such that placement of the n transmitting dipole sensors and the n receiving dipole sensors with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$
$$\phi_i^T = (4i-3)\frac{90}{n}$$
$$\hat{u}_i^T = -(-1)^i \hat{\rho}$$
$$r_i^R = a$$
$$\phi_i^R = (4i-5)\frac{90}{n}$$
$$\hat{u}_i^R = -(-1)^i \hat{\rho}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors and the receiving dipole sensors are disposed.

The number of transmitting sensors and the number of receiving sensors can have an arrangement of n transmitting dipole sensors and n receiving dipole sensors such that placement of the n transmitting dipole sensors and the n receiving dipole sensors with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$
$$\phi_i^T = (4i-5)\frac{90}{n}$$
$$\hat{u}_i^T = -(-1)^i \hat{\phi}$$
$$r_i^R = a$$
$$\phi_i^R = (4i-5)\frac{90}{n}$$
$$\hat{u}_i^R = -(-1)^i \hat{\rho}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors and the receiving dipole sensors are disposed.

The number of transmitting sensors and the number of receiving sensors can have an arrangement of n transmitting dipole sensors and only one receiving sensor such that placement of the n transmitting dipole sensors and the only one receiving sensor with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$
$$\phi_i^T = (4i-4)\frac{90}{n}$$
$$\hat{u}_i^T = -(-1)^i \hat{\rho}$$
$$r_i^R = 0$$
$$\hat{u}_i^R = \hat{z}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors are disposed.

In another example system, the number of transmitting sensors and the number of receiving sensors arranged to generate deep high-order azimuthal sensitivity can include a transmitter wire and a receiver wire operatively controlled as a pair, each of the transmitter wire and the receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion. The periodic wrapping can be arranged as a single wire having two ends to couple to a source, the second portion being 180° shifted from the first portion with respect to the tool structure. The single wire can include wire segments that are concatenated. The first portion and the second portion can be separate wires, the first portion having two ends to couple to a first source and the second portion having two ends to couple to a second source, the second portion being 180° shifted from the first portion with respect to the tool structure. Each periodic wrapping can include wiring internal to the tool structure. The periodic wrapping, including internal wiring, can be arranged as a single wire having two ends.

The example system can include two periodic wrappings on the tool structure, each of the two periodic wrappings having a period different from each other. The example system can include a plurality of transmitter wires and a plurality of receiver wires operatively controlled as pairs, each transmitter wire and each receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion, each transmitter periodic wrapping having a period equal to a period of a receiver periodic wrapping to which it is operatively paired, at least one pair having a period different from another pair. The transmitter wires can be disposed along a longitudinal axis of the tool structure in a sequential manner with respect to the period of each transmitter, and the receiver wires can be disposed along the longitudinal axis of the tool structure in a sequential manner with respect to the period of each receiver. The sequential manner for both the transmitter wires and the receiver wires can be from a largest period to a smallest period ordered by period size. The periodic wrapping of the transmitter wire can be sinusoidal, triangular, or rectangular.

The example system can include a data processing unit operable with the control unit such that from generation of a number of deep high-order azimuthal sensitivity modes, the data processing unit can be structured to synthetically sum the deep high-order azimuthal sensitivity modes to establish deep azimuthal focusing. The example system can include a mode adder operable with the control unit such that from generation of a number of deep high-order azimuthal sensitivity modes, the mode adder can be structured to sum the deep high-order azimuthal sensitivity modes to establish deep azimuthal focusing.

In a second example system, the number of transmitting sensors and the number of receiving sensors arranged to generate deep high-order azimuthal sensitivity can include multiple dipole antennas having controlled polarity, the control unit arranged to selectively control the polarity of the multiple dipole antennas. The transmitting sensors of the multiple dipole antennas can be arranged in a transmitter station with each transmitting sensor at a different angular position around a circumference of the tool structure, the transmitter station disposed in an array of transmitter stations. A multiple dipole antenna operable as one of the receiving sensors can be arranged as a receiver station in an array of receiver stations. In an embodiment, the receiver station can have multiple dipole antennas operable as receiving sensors with each receiving sensor of the receiver station at a different angular position around a circumference of the tool structure with respect to the other receiving sensors in the station. The transmitter stations and the receiver stations can be disposed along a longitudinal axis of the tool separate to operatively provide a range of depths of investigation.

The number of transmitting sensors can be magnetic dipoles selected from a group including coils and solenoids or the number of transmitting sensors can be electric dipoles selected from a group including wire antennas, toroids, and electrodes. The transmitting sensors can include a toroid having windings such that a density of the windings is varied azimuthally on the toroid.

The second example system can include a data processing unit operable with the control unit such that from generation of a number of deep high-order azimuthal sensitivity modes, the data processing unit can be structured to synthetically sum the deep high-order azimuthal sensitivity modes to establish deep azimuthal focusing. The second example system can include a mode adder operable with the control unit such that from generation of a number of deep high-order azimuthal sensitivity modes, the mode adder can be structured to sum the deep high-order azimuthal sensitivity modes to establish deep azimuthal focusing.

In a third example system, the number of transmitting sensors and the number of receiving sensors arranged to generate deep high-order azimuthal sensitivity can include multiple dipole antennas operable under controlled rotation by the control unit. One or more of the multiple dipole antennas can be operable as transmitting sensors disposed in a housing different from one or more of the multiple dipole antennas operable as the receiving sensors. The control unit can be operable to rotate one or more of the multiple dipole antennas operable as transmitting sensors at a rotation speed different from a rotation speed of one or more of the multiple dipole antennas operable as receiving sensor. In an embodiment, only one of the multiple dipole antennas is operated as a rotating transmitter sensor. The third example system can include a data processing unit operable with the control unit such that from generation of a number of deep high-order azimuthal sensitivity modes, the data processing unit can be structured to synthetically sum the deep high-order azimuthal sensitivity modes to establish deep azimuthal focusing. The third example system can include a mode adder operable with the control unit such that from generation of a number of deep high-order azimuthal sensitivity modes, the mode adder can be structured to sum the deep high-order azimuthal sensitivity modes to establish deep azimuthal focusing.

Various embodiments of a system can include a data processing unit operable to: decouple acquired signals into different azimuthal modes and calibrate the one or more signals, generating decoupled and calibrated signal data; perform azimuthal focusing, radial focusing, axial focusing, and inversion based on the decoupled and calibrated signal data; and generate data related to one or more of the borehole and the formation.

In various embodiments, a method can comprise: activating one or more transmitting sensors of a tool disposed in a borehole to transmit into a formation; selectively acquiring one or more signals at one or more receiving sensors of the tool in response to transmission by the one or more transmitting sensors, wherein the one or more transmitting sensors, the one or more receiving sensors, or both the one or more transmitting sensors and the one or more receiving sensors include one or more sensors structured as a multi-pole sensor; and controlling the activation and the selective acquisition, generating deep high-order azimuthal sensitivity. The one or more transmitting sensors can include one or more multi-pole transmitter sensors and the one or more receiving sensors can include one or more multi-pole receiver sensors, the one or more multi-pole transmitter sensors and the one or more multi-pole receiver sensors arranged to generate the deep high-order azimuthal sensitivity. Generating deep high-order azimuthal sensitivity can include establishing the deep high-order azimuthal sensitivity by using a combination of magnetic dipoles. Generating deep high-order azimuthal sensitivity includes establishing the deep high-order azimuthal sensitivity by using a combination of deep high-order azimuthal sensitivity modes.

The one or more transmitting sensors and the one or more receiving sensors can have an arrangement of n transmitting dipole sensors and n receiving dipole sensors such that placement of the n transmitting dipole sensors and the n receiving dipole sensors with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$
$$\phi_i^T = (4i-3)\frac{90}{n}$$
$$\hat{u}_i^T = -(-1)^i\hat{\rho}$$
$$r_i^R = a$$

$$\phi_i^R = (4i-5)\frac{90}{n}$$
$$\hat{u}_i^R = -(-1)^i\hat{\rho}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors and the receiving dipole sensors are disposed.

The one or more transmitting sensors and the one or more receiving sensors can have an arrangement of n transmitting dipole sensors and n receiving dipole sensors such that placement of the n transmitting dipole sensors and the n receiving dipole sensors with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$
$$\phi_i^T = (4i-5)\frac{90}{n}$$
$$\hat{u}_i^T = -(-1)^i\hat{\phi}$$
$$r_i^R = a$$
$$\phi_i^R = (4i-5)\frac{90}{n}$$
$$\hat{u}_i^R = -(-1)^i\hat{\rho}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors and the receiving dipole sensors are disposed.

The one or more transmitting sensors and the one or more receiving sensors can have an arrangement of n transmitting dipole sensors and only one receiving sensor such that placement of the n transmitting dipole sensors and the only one receiving sensor with respect to the tool structure, in terms of $\rho$, $\phi$ and $\hat{z}$ unit vectors in cylindrical coordinates along radial, azimuthal and z-directions with the z-direction being along an axis of the tool structure, is given by $$r_i^T = a$$
$$\phi_i^T = (4i-4)\frac{90}{n}$$
$$\hat{u}_i^T = -(-1)^i\hat{\rho}$$
$$r_i^R = 0$$
$$\hat{u}_i^R = \hat{z}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors are disposed.

In another example method, the one or more transmitting sensors and the one or more receiving sensors arranged to generate the deep high-order azimuthal sensitivity can include a transmitter wire and a receiver wire operatively controlled as a pair, each of the transmitter wire and the receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion. The periodic wrapping can be arranged as a single wire having two ends to couple to a source, the second portion being 180° shifted from the first portion with respect to the tool structure. The first portion and the second portion can be separate wires, the first portion having two ends to couple to a first source and the second portion having two ends to couple to a second source, the second portion being 180° shifted from the first portion with respect to the tool structure. In an embodiment, each periodic wrapping can include wiring internal to the tool structure.

In an embodiment, the one or more transmitting sensors and the one or more receiving sensors can include two periodic wrappings on the tool structure, each of the two periodic wrappings having a period different from each other. In another embodiment, the one or more transmitting sensors and the one or more receiving sensors can include a plurality of transmitter wires and a plurality of receiver wires operatively controlled as pairs, each transmitter wire and each receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion, each transmitter periodic wrapping having a period equal to a period of a receiver periodic wrapping to which it is operatively paired, at least one pair having a period different from another pair.

The example method can include generating a number of deep high-order azimuthal sensitivity modes and synthetically summing the deep high-order azimuthal sensitivity modes to establish deep azimuthal focusing. The example method can include generating a number of deep high-order azimuthal sensitivity modes and summing, using a mode adder, the deep high-order azimuthal sensitivity modes to establish deep azimuthal focusing.

In a second example method, generating deep high-order azimuthal sensitivity can include selectively controlling polarity of multiple dipole antennas. The second example method can include generating a number of deep high-order azimuthal sensitivity modes and synthetically summing the deep high-order azimuthal sensitivity modes to establish deep azimuthal focusing. The second example method can include generating a number of deep high-order azimuthal sensitivity modes and summing, using a mode adder, the deep high-order azimuthal sensitivity modes to establish deep azimuthal focusing.

In a third example method, generating deep high-order azimuthal sensitivity can include controllably rotating a number of multiple dipole antennas. Controllably rotating multiple dipole antennas can include rotating only one transmitter sensor. The third example method can include generating a number of deep high-order azimuthal sensitivity modes and synthetically summing the deep high-order azimuthal sensitivity modes to establish deep azimuthal focusing. The third example method can include generating a number of deep high-order azimuthal sensitivity modes and summing, using a mode adder, the deep high-order azimuthal sensitivity modes to establish deep azimuthal focusing.

Various embodiments of a method can include processing the one or more signals, the processing can include: decoupling one or more signals into different azimuthal modes and calibrating the one or more signals, generating decoupled and calibrated signal data; performing azimuthal focusing, radial focusing, axial focusing, and inversion based on the decoupled and calibrated signal data; and generating data related to one or more of the borehole and the formation from performing the azimuthal focusing, the radial focusing, the axial focusing, and the inversion. Decoupling and calibrating the one or more signals can include: simulating the formation with an impulse resistivity; generating a simulated signal voltage from simulating the formation with the impulse resistivity; and deconvolving a measured signal voltage with the simulated signal voltage.

Various embodiments of a method can include prior to deploying the tool in the borehole, generating and storing, in memory, a mode decoupling and calibration matrix such that the one or more signals can be decoupled and calibrated in operation of the tool in the borehole using the mode decoupling and calibration matrix, the mode decoupling and calibration matrix generated by: operating the tool in a known formation with azimuthal periodicity; making measurements at a selected mode; constructing a response matrix based on the measurements for the selected mode and azimuthal periodicity; and inverting the response matrix.

Different embodiments of systems and methods of operating system, as taught herein, can be combined in a number of arrangements. The combination can include permutations of features of the systems, permutations of features of methods of operating the systems, or permutations of features of the systems and features of methods of operating the systems.

In various embodiments, a machine-readable storage device can have instructions stored thereon, which, when executed by one or more processors of a machine, cause the machine to perform operations, the operations comprising any of the features of methods of making measurements via multi-pole induction and analyzing the measurements in a manner identical to or similar to the methods described herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, a system can comprise a tool having an array of transmitters and an array of receivers; a control unit operable to manage generation of signals from the array of transmitters and to manage collection of received signals at the array of receivers; and a data processing unit, wherein the tool, the control unit, and the data processing unit are structured to operate according to any of the features of methods of making measurements via multi-pole induction and analyzing the measurements in a manner identical to or similar to the methods described herein. The system can include one or more machine-readable storage devices to implement one or more of these features.

Figure 21:
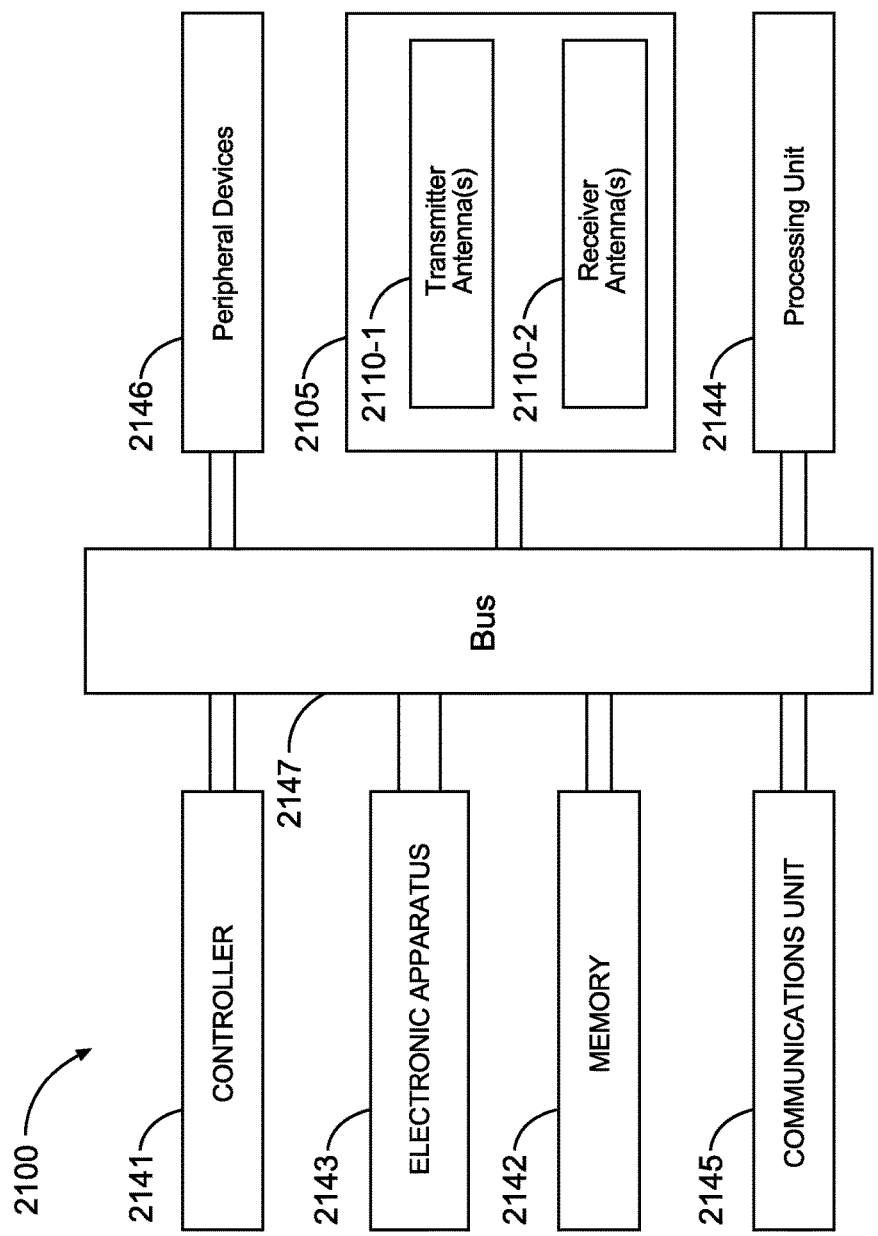
FIG. 21 depicts a block diagram of features of an embodiment of a system including a multi-pole sensor tool, in accordance with various embodiments.

FIG. 21 depicts a block diagram of features of an embodiment of a system 2100 including a sensor tool 2105 having an arrangement of transmitters and receivers operable as a multi-pole induction tool. The arrangements of transmitters 2110-1 and receivers 2110-2 of sensor tool 2105 can be realized similar to or identical to arrangements discussed herein. The arrangements can include one or more transmitter-receiver antenna pairs arranged to be selectively controlled to generate deep high-order azimuthal sensitivity. For example, control of the one or more transmitter-receiver antenna pairs can include, but is not limited to, selective polarity of the transmitter and the receiver in the transmitter-receiver antenna pairs.

System 2100 can also include a controller 2141, a memory 2142, an electronic apparatus 2143, and a communications unit 2145. Controller 2141, memory 2142, and communications unit 2145 can be arranged to operate sensor tool 2105 as a multi-pole antennas to provide higher order azimuthal modes. Controller 2141, memory 2142, and electronic apparatus 2143 can be realized to control activation of transmitter antennas 2110-1 and selection of receiver antennas 2110-2 in sensor tool 2105 and to manage processing schemes in accordance with measurement procedures and signal processing as described herein. Communications unit 2145 can include downhole communications in a drilling operation. Such downhole communications can include a telemetry system.

System 2100 can also include a bus 2147, where bus 2147 provides electrical conductivity among the components of system 2100. Bus 2147 can include an address bus, a data bus, and a control bus, each independently configured. Bus 2147 can also use common conductive lines for providing one or more of address, data, or control, the use of which can be regulated by controller 2141. Bus 2147 can be configured such that the components of system 2100 are distributed. Such distribution can be arranged between downhole components such as transmitters 2110-1 and receivers 2110-2 of sensor tool 2105 and components that can be disposed on the surface of a well. Alternatively, the components can be co-located such as on one or more collars of a drill string or on a wireline structure.

In various embodiments, peripheral devices 2146 can include displays, additional storage memory, and/or other control devices that may operate in conjunction with controller 2141 and/or memory 2142. In an embodiment, controller 2141 can be realized as one or more processors. Peripheral devices 2146 can be arranged with a display with instructions stored in memory 2142 to implement a user interface to manage the operation of sensor tool 2105 and/or components distributed within system 2100. Such a user interface can be operated in conjunction with communications unit 2145 and bus 2147. Various components of system 2100 can be integrated with sensor tool 2105 such that processing identical to or similar to the processing schemes discussed with respect to various embodiments herein can be performed downhole in the vicinity of the measurement or at the surface.

Figure 22:
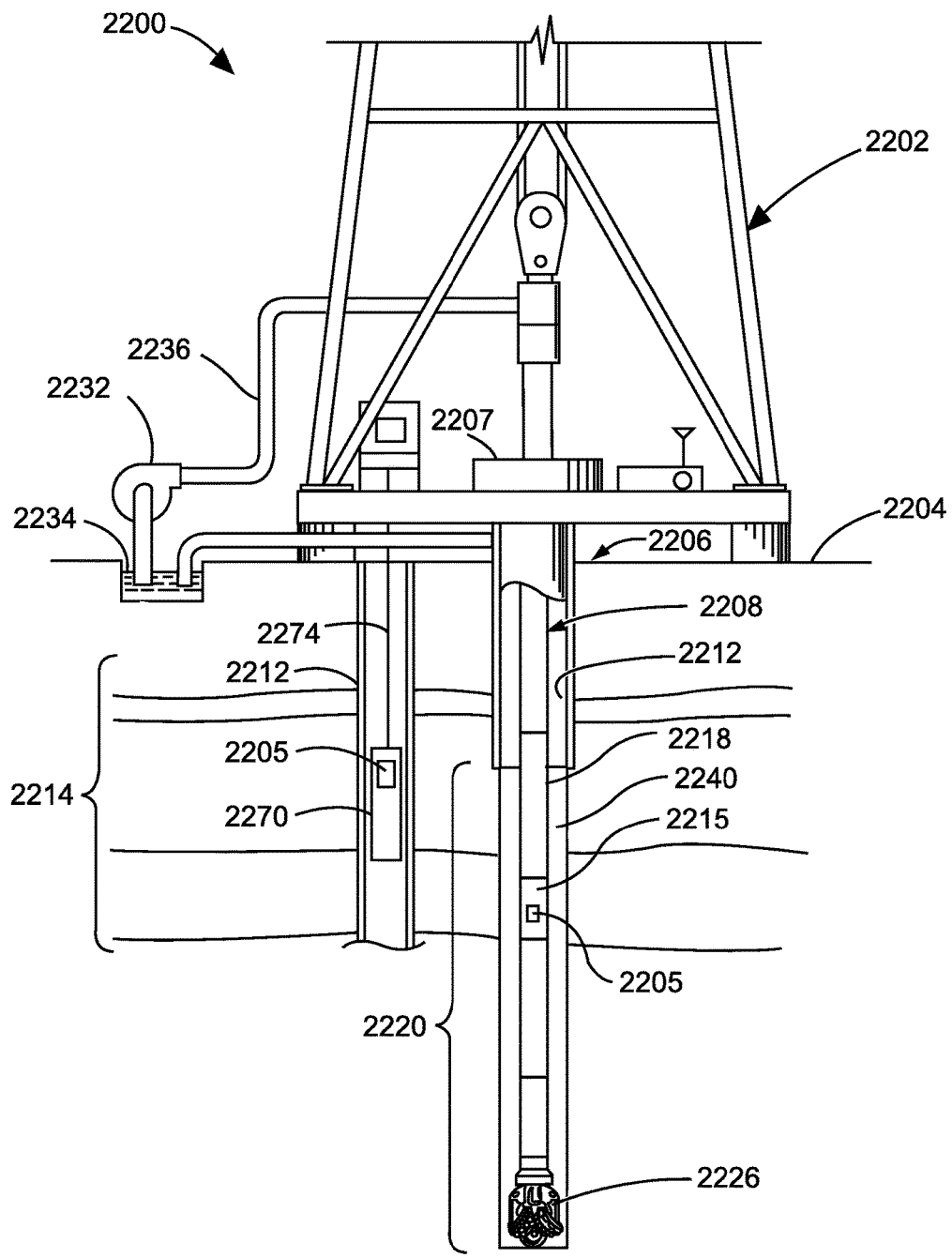
FIG. 22 depicts an embodiment of a system at a drilling site, where the system includes a multi-pole sensor tool in accordance with various embodiments.

FIG. 22 depicts an embodiment of a system 2200 at a drilling site, where the system 2200 includes a tool 2205 configured with sensors operable as a system of multi-pole antennas. A control unit and processing unit of the tool 2205 can be distributed among system 2200 or can be integrated with tool 2205 providing for control and analysis activities to be conducted downhole. The tool 2205 can be realized in a similar or identical manner to arrangements and processing discussed herein to make measurements in a borehole and to process the signals and data generated from signals acquired at the tool 2205.

The system 2200 can include a drilling rig 2202 located at a surface 2204 of a well 2206 and a string of drill pipes, that is, the drill string 2208, connected together so as to form a drilling string that is lowered through a rotary table 2207 into a wellbore or borehole 2212. The drilling rig 2202 can provide support for the drill string 2208. The drill string 2208 can operate to penetrate the rotary table 2207 for drilling the borehole 2212 through subsurface formations 2214. The drill string 2208 can include drill pipe 2218 and a bottom hole assembly 2220 located at the lower portion of the drill pipe 2218.

The bottom hole assembly 2220 can include a drill collar 2215, the tool 2205 attached to the drill collar 2215, and a drill bit 2226. The drill bit 2226 can operate to create the borehole 2212 by penetrating the surface 2204 and the subsurface formations 2214. The tool 2205 can be structured for an implementation in the borehole 2212 as a MWD system such as a LWD system. The housing containing the tool 2205 can include electronics to activate one or more transmitters of the tool 2205 and collect responses from one or more receivers of the tool 2205. Such electronics can include a processing unit to provide formation analysis, borehole analysis, or combinations thereof to the surface over a standard communication mechanism for operating a well. Alternatively, electronics can include a communications interface to provide signals output by receivers of the tool 2205 to the surface over a standard communication mechanism for operating a well, where these output signals can be analyzed at a processing unit at the surface to provide formation analysis, borehole analysis, or combinations thereof.

During drilling operations, the drill string 2208 can be rotated by the rotary table 2207. In addition to, or alternatively, the bottom hole assembly 2220 can also be rotated by a motor (e.g., a mud motor) that is located downhole. The drill collars 2215 can be used to add weight to the drill bit 2226. The drill collars 2215 also can stiffen the bottom hole assembly 2220 to allow the bottom hole assembly 2220 to transfer the added weight to the drill bit 2226, and in turn, assist the drill bit 2226 in penetrating the surface 2204 and subsurface formations 2214.

During drilling operations, a mud pump 2232 can pump drilling fluid (sometimes known by those of skill in the art as "drilling mud") from a mud pit 2234 through a hose 2236 into the drill pipe 2218 and down to the drill bit 2226. The drilling fluid can flow out from the drill bit 2226 and be returned to the surface 2204 through an annular area 2240 between the drill pipe 2218 and the sides of the borehole 2212. The drilling fluid may then be returned to the mud pit 2234, where such fluid is filtered. In some embodiments, the drilling fluid can be used to cool the drill bit 2226, as well as to provide lubrication for the drill bit 2226 during drilling operations. Additionally, the drilling fluid may be used to remove subsurface formation 2214 cuttings created by operating the drill bit 2226.

In various embodiments, the tool 2205 may be included in a tool body 2270 coupled to a logging cable 2274 such as, for example, for wireline applications. The tool body 2270 containing the tool 2205 can include electronics to activate one or more transmitters of the tool 2205 and collect responses from one or more receivers of the tool 2205. Such electronics can include a processing unit to provide formation analysis, borehole analysis, or combinations thereof to the surface over a standard communication mechanism for operating a well. Alternatively, electronics can include a communications interface to provide signals output by receivers of the tool 2205 to the surface over a standard communication mechanism for operating a well, where these output signals can be analyzed at a processing unit at the surface to provide formation analysis, borehole analysis, or combinations thereof. The logging cable 2274 may be realized as a wireline (multiple power and communication lines), a mono-cable (a single conductor), and/or a slick-line (no conductors for power or communications), or other appropriate structure for use in the borehole 2212.

Tools and methods that utilize multi-pole antennas identical to or similar to embodiments discussed herein may used to produce deep azimuthal focusing of electromagnetic waves and to construct deep 3D images of electromagnetic properties of formations from a single well. This may allow new geological profiling applications and also significantly improve evaluation of formations. Data from this tool may be used to optimize drilling and production operations.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system for implementation in a borehole of a well comprising:
a plurality of transmitting dipole sensors arranged on a tool structure, wherein each of the plurality of transmitting dipole sensors are azimuthally positioned around an axis at a first set of angular coordinates, wherein the transmitting dipole sensors comprise at least one of an electric dipole or a magnetic dipole;
a plurality of receiving dipole sensors arranged on the tool structure, the plurality of receiving dipole sensors configured to acquire a signal in response to activation of the plurality of transmitting dipole sensors, wherein each of the plurality of receiving dipole sensors are azimuthally distributed around the axis at a second set of azimuthal coordinates, and wherein at least one of the angles in the second set of azimuthal coordinates is at least five degrees azimuthally shifted with respect to each angle of the first set of angular coordinates;
a controller arranged to control the activation of the plurality of transmitting dipole sensors and to acquire the signal by the plurality of receiving dipole sensors in response to the activation of the plurality of transmitting dipole sensors, wherein the activation comprises concurrent activation of the plurality of transmitting dipole sensors;
wherein each of the plurality of transmitting dipole sensors include a toroid having windings such that a density of the windings is varied azimuthally on the toroid.

2. The system of claim 1, wherein the plurality of transmitting dipole sensors comprises n transmitting dipole sensors that are arranged to generate electric fields with substantially n-order harmonic azimuthal distribution using a combination of magnetic dipoles, wherein n is greater than two, and wherein each of the plurality of transmitting dipole sensors are azimuthally shifted from a different one of the plurality of receiving dipole sensors.

3. The system of claim 1, wherein the plurality of transmitting dipole sensors and the plurality of receiving dipole sensors have an arrangement of n transmitting dipole sensors and n receiving dipole sensors, wherein the arrangement of the n transmitting dipole sensors and the n receiving dipole sensors with respect to the tool structure, in terms of $\hat{\rho}$, $\hat{\phi}$ and $\hat{z}$ unit vectors in cylindrical coordinates along radial, azimuthal and z-directions with the z-direction being along the axis, is given by $$\phi_i^T = (4i-3)\frac{90}{n}$$
$$\hat{u}_i^T = -(-1)^i \hat{\rho}$$
$$\phi_i^R = (4i-5)\frac{90}{n}$$
$$\hat{u}_i^R = -(-1)^i \hat{\rho}$$

with $\phi_i^T$, $u_i^T$, $\phi_i^R$, and $u_i^R$ denoting angular position of the $i^{th}$ transmitting dipole sensor in degrees, orientation vector of the $i^{th}$ transmitting dipole sensor, angular position of the $i^{th}$ receiving dipole sensor in degrees, and orientation vector of the $i^{th}$ receiving dipole sensor, respectively.

4. The system of claim 1, wherein the number of transmitting sensors and the number of receiving sensors have an arrangement of n transmitting dipole sensors and n receiving dipole sensors such that placement of the n transmitting dipole sensors and the n receiving dipole sensors with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$
$$\phi_i^T = (4i-5)\frac{90}{n}$$
$$\hat{u}_i^T = -(-1)^i \hat{\phi}$$
$$r_i^R = a$$
$$\phi_i^R = (4i-5)\frac{90}{n}$$
$$\hat{u}_i^R = -(-1)^i \hat{\rho}$$

with $r_i^T$, $\phi_i^T$, $u_i^T$, $r_i^R$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors and the receiving dipole sensors are disposed.

5. The system of claim 1, wherein the number of transmitting sensors and the number of receiving sensors have an arrangement of n transmitting dipole sensors and only one receiving sensor such that placement of the n transmitting dipole sensors and the only one receiving sensor with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by $$r_i^T = a$$

$$\phi_i^T = (4i-4)\frac{90}{n}$$

$$\hat{u}_i^T = -(-1)^i \hat{\rho}$$

$$r_i^R = 0$$

$$\hat{u}_i^R = \hat{z}$$

with $r_i^T$, $\phi_i^T$, $u_i^T$, $\phi_i^R$, and $u_i^R$ denoting radial position of the $i^{th}$ transmitter, angular position of the $i^{th}$ transmitter in degrees, orientation vector of the $i^{th}$ transmitter, radial position of the $i^{th}$ receiver, angular position of the $i^{th}$ receiver in degrees, and orientation vector of the $i^{th}$ receiver, respectively, with a being the distance from the axis at which the transmitting dipole sensors are disposed.

6. The system of claim 1, wherein the plurality of transmitting dipole sensors and the plurality of receiving dipole sensors are arranged to establish deep azimuthal focusing by using a combination of deep high-order azimuthal sensitivity modes.

7. The system of claim 1, wherein the number of transmitting sensors and t the number of receiving sensors arranged to generate deep high-order azimuthal sensitivity include a transmitter wire and a receiver wire operatively controlled as a pair, each of the transmitter wire and the receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion.

8. The system of claim 7, wherein the periodic wrapping is arranged as a single wire having two ends to couple to a source, the second portion being 180° shifted from the first portion with respect to the tool structure.

9. The system of claim 8, wherein the single wire includes wire segments that are concatenated.

10. The system of claim 7, wherein the first portion and the second portion are separate wires, the first portion having two ends to couple to a first source and the second portion having two ends to couple to a second source, the second portion being 180° shifted from the first portion with respect to the tool structure.

11. The system of claim 7, wherein each periodic wrapping includes wiring internal to the tool structure.

12. The system of claim 11, wherein the periodic wrapping is arranged as a single wire having two ends.

13. The system of claim 7, wherein the system includes two periodic wrappings on the tool structure, each of the two periodic wrappings having a period different from each other.

14. The system of claim 7, wherein the system includes a plurality of transmitter wires and a plurality of receiver wires operatively controlled as pairs, each transmitter wire and each receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion, each transmitter periodic wrapping having a period equal to a period of a receiver periodic wrapping to which it is operatively paired, at least one pair having a period different from another pair.

15. The system of claim 14, wherein the transmitter wires are disposed along a longitudinal axis of the tool structure in a sequential manner with respect to the period of each transmitter, and the receiver wires are disposed along the longitudinal axis of the tool structure in a sequential manner with respect to the period of each receiver.

16. The system of claim 15, wherein the sequential manner for both the transmitter wires and the receiver wires is from a largest period to a smallest period ordered by period size.

17. The system of claim 7, wherein the periodic wrapping of the transmitter wire is sinusoidal, triangular, or rectangular.

18. The system of claim 7, wherein the system includes a data processing unit operable with the control unit such that from generation of a number of deep high-order azimuthal sensitivity modes, the data processing unit is structured to synthetically sum the deep high-order azimuthal sensitivity modes to establish deep azimuthal focusing.

19. The system of claim 7, wherein the system includes a mode adder operable with the control unit such that from generation of a number of deep high-order azimuthal sensitivity modes, the mode adder is structured to sum the deep high-order azimuthal sensitivity modes to establish deep azimuthal focusing.

20. The system of claim 1, wherein the plurality of transmitting dipole sensors and the plurality of receiving dipole sensors arranged to generate deep high-order azimuthal sensitivity include multiple dipole antennas having controlled polarity, the controller arranged to selectively control the controlled polarity of the multiple dipole antennas.

21. The system of claim 20, wherein at least two of the plurality of transmitting dipole sensors of the multiple dipole antennas are arranged in a transmitter station with each of the two of the plurality of transmitting dipole sensors are at a different angular position around a circumference of the tool structure, the transmitter station disposed in an array of transmitter stations.

22. The system of claim 21, wherein one of the multiple dipole antennas is operable as one of the plurality of receiving dipole sensors and is arranged as a receiver station in an array of receiver stations.

23. The system of claim 22, wherein the receiver station has multiple dipole antennas operable as the plurality of receiving dipole sensors, wherein each receiving dipole sensor of the receiver station at a different angular position around a circumference of the tool structure with respect to the other receiving sensors in the receiver station.

24. The system of claim 23, further comprising multiple transmitter stations and multiple receiver stations, wherein each of the multiple transmitter stations and the multiple receiver stations are disposed along a longitudinal axis of the tool structure separate to operatively provide a range of depths of investigation.

25. The system of claim 20, wherein the plurality of transmitting dipole sensors are magnetic dipoles selected from a first group including coils and solenoids or the plurality of transmitting dipole sensors are electric dipoles selected from a second group including wire antennas, toroids, and electrodes.

26. The system of claim 20, wherein the system includes a data processor operable with the controller such that from generation of deep high-order azimuthal sensitivity modes, the data processor is structured to synthetically sum the deep high-order azimuthal sensitivity modes to establish deep azimuthal focusing.

27. The system of claim 20, wherein the system includes a mode adder operable with the controller such that from generation of deep high-order azimuthal sensitivity modes, the mode adder is structured to sum the deep high-order azimuthal sensitivity modes to establish deep azimuthal focusing.

28. The system of claim 1, wherein the number of transmitting sensors and the number of receiving sensors arranged to generate deep high-order azimuthal sensitivity include multiple dipole antennas operable under controlled rotation by the control unit.

29. The system of claim 28, wherein one or more of the multiple dipole antennas are operable as transmitting sensors disposed in a housing different than one or more of the multiple dipole antennas operable as the receiving sensors.

30. The system of claim 28, wherein the control unit is operable to rotate one or more of the multiple dipole antennas operable as transmitting sensors at a rotation speed different from a rotation speed of one or more of the multiple dipole antennas operable as receiving sensor.

31. The system of claim 28, wherein only one of the multiple dipole antennas is operated as a rotating transmitter sensor.

32. The system of claim 28, wherein the system includes a data processing unit operable with the control unit such that from generation of a number of deep high-order azimuthal sensitivity modes, the data processing unit is structured to synthetically sum the deep high-order azimuthal sensitivity modes to establish deep azimuthal focusing.

33. The system of claim 28, wherein the system includes a mode adder operable with the control unit such that from generation of a number of deep high-order azimuthal sensitivity modes, the mode adder is structured to sum the deep high-order azimuthal sensitivity modes to establish deep azimuthal focusing.

34. The system of claim 1, wherein the system includes a data processor operable to:
  decouple the acquired signals into different azimuthal modes and calibrate one or more signals to generate decoupled and calibrated signal data;
  perform azimuthal focusing, radial focusing, axial focusing, and inversion based on the decoupled and calibrated signal data; and
  generate data related to one or more of a borehole and a formation.

* * * * *

UNITED STATES PATENT AND TRADEMARK OFFICE
CERTIFICATE OF CORRECTION

PATENT NO. : 10,444,396 B2
APPLICATION NO. : 14/648473
DATED : October 15, 2019
INVENTOR(S) : Burkay Donderici Page 1 of 1

It is certified that error appears in the above-identified patent and that said Letters Patent is hereby corrected as shown below:

In the Specification

Column 8, Line 32, the portion reading "Multi-pole excitation may achieved" should read --Multi-pole excitation may be achieved--.

Column 25, Line 18, the portion reading "as a multi-pole antennas" should read --as a multi-pole antenna--.

Column 26, Line 20, the portion reading "as a MWD" should read --as an MWD--.

Column 27, Line 13, the portion reading "herein may used" should read --herein may be used--.

Signed and Sealed this
Third Day of December, 2019

Andrei Iancu
*Director of the United States Patent and Trademark Office*